US008425303B2

(12) United States Patent
Kennedy et al.

(10) Patent No.: US 8,425,303 B2
(45) Date of Patent: Apr. 23, 2013

(54) GAMING SYSTEM, GAMING DEVICE AND METHOD FOR PROVIDING A PERSISTENCE GAME WITH MULTIPLE SYMBOL EVALUATIONS

(75) Inventors: Timothy L. Kennedy, Reno, NV (US); Cullen P. O'Day, Reno, NV (US); Paulina Rodgers, Reno, NV (US); Robert F. Lester, Reno, NV (US)

(73) Assignee: IGT, Reno, NV (US)

( * ) Notice: Subject to any disclaimer, the term of this patent is extended or adjusted under 35 U.S.C. 154(b) by 714 days.

(21) Appl. No.: 12/618,184

(22) Filed: Nov. 13, 2009

(65) Prior Publication Data

US 2011/0117989 A1 May 19, 2011

(51) Int. Cl.
*A63F 13/00* (2006.01)

(52) U.S. Cl.
USPC .................. 463/20; 463/12; 463/16; 463/17; 463/18; 463/19; 463/25; 463/26; 463/27

(58) Field of Classification Search ................ 463/9, 12, 463/16–23, 25–28, 43
See application file for complete search history.

(56) References Cited

U.S. PATENT DOCUMENTS

| | | | |
|---|---|---|---|
| 4,837,728 | A | 6/1989 | Barrie et al. |
| 5,393,057 | A | 2/1995 | Marnell, II |
| 5,395,111 | A | 3/1995 | Inoue |
| 5,431,408 | A | 7/1995 | Adams |
| 5,584,764 | A | 12/1996 | Inoue |
| 5,609,524 | A | 3/1997 | Inoue |
| 5,664,998 | A | 9/1997 | Seelig et al. |
| 5,722,891 | A | 3/1998 | Inoue |
| 5,752,881 | A | 5/1998 | Inoue |
| 5,769,716 | A | 6/1998 | Saffari et al. |
| 5,833,537 | A | 11/1998 | Barrie |
| 5,863,249 | A | 1/1999 | Inoue |
| 5,984,782 | A | 11/1999 | Inoue |
| 6,135,884 | A | 10/2000 | Hedrick et al. |
| 6,241,607 | B1 | 6/2001 | Payne et al. |
| 6,270,412 | B1 | 8/2001 | Crawford et al. |
| 6,328,649 | B1 | 12/2001 | Randall et al. |
| 6,413,162 | B1 | 7/2002 | Baerlocher et al. |
| 6,461,241 | B1 | 10/2002 | Webb et al. |
| 6,464,581 | B1 | 10/2002 | Yoseloff et al. |
| 6,561,904 | B2 | 5/2003 | Locke et al. |

(Continued)

FOREIGN PATENT DOCUMENTS

| | | |
|---|---|---|
| WO | WO 98/19280 | 5/1998 |
| WO | WO 2008/156846 | 12/2008 |

*Primary Examiner* — Sunit Pandya
(74) *Attorney, Agent, or Firm* — Neal, Gerber & Eisenberg LLP

(57) ABSTRACT

In one embodiment, the gaming system and method disclosed herein employs a symbol accumulation sequence and a symbol evaluation sequence. The symbol accumulation sequence includes an accumulation of a designated quantity of symbols in association with a persistence game. The symbol accumulation sequence also includes the maintenance of a persistence game arrangement that displays a designated quantity of currently accumulated symbols (which in certain instances, includes some, but not all of the total number of symbols accumulated). In one embodiment, the symbol evaluation sequence includes the gaming system determining and providing an award based on the accumulated symbols of the persistence game. In another embodiment, the symbol evaluation sequence includes the gaming system determining and providing an award based on at least one of the accumulated symbols of the persistence game and at least one symbol generated for a current play of a wagering game.

32 Claims, 25 Drawing Sheets

U.S. PATENT DOCUMENTS

| | | | |
|---|---|---|---|
| 6,599,193 | B2 | 7/2003 | Baerlocher et al. |
| 6,676,511 | B2 | 1/2004 | Payne et al. |
| 6,715,756 | B2 | 4/2004 | Inoue |
| 6,726,563 | B1 | 4/2004 | Baerlocher et al. |
| 6,739,971 | B2 | 5/2004 | Devaull |
| 6,835,133 | B2 | 12/2004 | Baerlocher et al. |
| 6,857,958 | B2 | 2/2005 | Osawa |
| 6,866,583 | B2 | 3/2005 | Glavich et al. |
| 6,910,962 | B2 | 6/2005 | Marks et al. |
| 6,935,950 | B2 | 8/2005 | Tarantino |
| 6,960,133 | B1 | 11/2005 | Marks et al. |
| 7,070,501 | B2 | 7/2006 | Cormack et al. |
| 7,070,502 | B1 | 7/2006 | Bussick et al. |
| 7,238,110 | B2 | 7/2007 | Glavich et al. |
| 7,300,351 | B2 | 11/2007 | Thomas |
| 7,322,887 | B2 | 1/2008 | Belger et al. |
| 7,326,115 | B2 | 2/2008 | Baerlocher |
| 7,371,171 | B1 | 5/2008 | Englman et al. |
| 7,371,172 | B2 | 5/2008 | Inoue |
| 7,455,585 | B2 | 11/2008 | Englman |
| 7,513,828 | B2 | 4/2009 | Nguygen et al. |
| 7,591,724 | B2 | 9/2009 | Baerlocher |
| 7,666,085 | B2 | 2/2010 | Vorias |
| 2002/0025845 | A1 | 2/2002 | Cannon |
| 2004/0048646 | A1 | 3/2004 | Visocnik |
| 2004/0053662 | A1 | 3/2004 | Pacey |
| 2004/0242313 | A1 | 12/2004 | Munoz |
| 2005/0054421 | A1 | 3/2005 | Hughs-Baird et al. |
| 2005/0059478 | A1 | 3/2005 | Peterson et al. |
| 2005/0096121 | A1 | 5/2005 | Gilliland et al. |
| 2005/0192081 | A1 | 9/2005 | Marks et al. |
| 2006/0019738 | A1 | 1/2006 | Baerlocher et al. |
| 2006/0040728 | A1 | 2/2006 | Fuller |
| 2006/0058097 | A1 | 3/2006 | Berman et al. |
| 2006/0068881 | A1 | 3/2006 | Casey |
| 2006/0068893 | A1 * | 3/2006 | Jaffe et al. ...................... 463/20 |
| 2006/0073872 | A1 | 4/2006 | B-Jensen et al. |
| 2006/0079317 | A1 | 4/2006 | Flemming et al. |
| 2006/0189377 | A1 | 8/2006 | Gomez et al. |
| 2007/0060246 | A1 | 3/2007 | Baerlocher et al. |
| 2007/0060255 | A1 | 3/2007 | Baerlocher et al. |
| 2007/0060297 | A1 | 3/2007 | Hein et al. |
| 2007/0117610 | A1 | 5/2007 | Webb et al. |
| 2007/0167223 | A1 | 7/2007 | Bleich et al. |
| 2007/0259713 | A1 | 11/2007 | Fiden et al. |
| 2008/0045302 | A1 | 2/2008 | Low |
| 2008/0108408 | A1 | 5/2008 | Wolf |
| 2008/0132320 | A1 | 6/2008 | Rodgers |
| 2009/0011822 | A1 | 1/2009 | Englman et al. |
| 2009/0011823 | A1 | 1/2009 | Englman et al. |
| 2009/0011824 | A1 | 1/2009 | Englman et al. |
| 2009/0069068 | A1 | 3/2009 | Cole et al. |
| 2009/0075722 | A1 | 3/2009 | Louie et al. |
| 2009/0082087 | A1 | 3/2009 | Pacey et al. |
| 2009/0117989 | A1 | 5/2009 | Arezina et al. |
| 2009/0124332 | A1 | 5/2009 | Baerlocher |
| 2009/0124346 | A1 | 5/2009 | Baerlocher |
| 2009/0124362 | A1 | 5/2009 | Cuddy et al. |
| 2009/0233683 | A1 | 9/2009 | Kim |
| 2010/0004049 | A1 | 1/2010 | Ching et al. |
| 2010/0016071 | A1 | 1/2010 | Jaffe et al. |
| 2010/0029363 | A1 | 2/2010 | Hoffman et al. |
| 2010/0120525 | A1 | 5/2010 | Baerlocher et al. |

* cited by examiner

GAMING SYSTEM, GAMING DEVICE AND METHOD FOR PROVIDING A PERSISTENCE GAME WITH MULTIPLE SYMBOL EVALUATIONS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Certain secondary or bonus games are activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known secondary games are played over the course of a number of plays of the primary or base game. Such secondary games provide one or more players an award for their persistence in playing the gaming machine for a prolonged number of plays or period of time. In these persistence or persistence-type secondary games, in association with one or more plays of the primary game, a portion of the secondary game is played or at least one secondary game element is provided to the player. After that player (or a different player currently playing at the gaming terminal) has obtained a designated number of secondary game elements (or advanced to the secondary game a designated number of times), these gaming machines provide a secondary game award to the player currently playing the gaming machine. The provided secondary game award is based on the plurality of obtained secondary game elements (or the plurality of plays of the secondary game) which randomly occur based on triggering events associated with the plurality of plays of the primary game.

To increase player enjoyment and excitement, it is desirable to provide players with new types of gaming devices that attract the player and keep the player entertained. Accordingly, a need exists for the further development of gaming devices.

SUMMARY

In various embodiments, the gaming system, gaming device and method disclosed herein employs a symbol accumulation sequence and a symbol evaluation sequence. The symbol accumulation sequence includes an accumulation of a plurality of symbols in association with a persistence game. The symbol accumulation sequence also includes the maintenance of a persistence game arrangement or matrix that displays a designated quantity of accumulated symbols. Such maintenance of the persistence game arrangement includes, in certain instances, removing at least one previously accumulated symbol from the persistence game arrangement to enable the gaming system to cause the persistence game arrangement to accumulate and display a newly generated symbol. The symbol evaluation sequence includes an evaluation of at least some of the previously accumulated symbols to determine an award. In one embodiment, the symbol evaluation sequence includes the gaming system determining and providing an award based on the accumulated symbols of the persistence game. In another embodiment, the symbol evaluation sequence includes the gaming system determining and providing an award based on at least one of the accumulated symbols of the persistence game and at least one symbol generated for a current play of a wagering game. Accordingly, the gaming system disclosed herein utilizes symbols generated for a plurality of wagering games in a persistence game to determine an award for the persistence game in one embodiment and an award for a wagering game in another embodiment.

Specifically, in one embodiment, the gaming system generates a plurality of symbols for each of a plurality of plays of a wagering game. For each of the plays of the wagering game, the gaming system determines whether the generated symbols form any winning symbol combinations and provides any awards associated with any formed winning symbol combinations. As part of the symbol accumulation sequence, after each play of the wagering game, the gaming system determines whether to accumulate and display any symbols from the wagering game for an ongoing persistence game. In one embodiment, if the gaming system determines to accumulate symbols from the wagering game, the gaming system causes the persistence game arrangement to accumulate and display generated symbols from the wagering game. In another embodiment, if the gaming system determines to accumulate symbols for the persistence game, the gaming system causes the persistence game arrangement to accumulate and display symbols which are associated with generated symbols from the wagering game, such as higher valued symbols. That is, in association with the persistence game, the gaming system collects symbols that are associated with or related to, but different from the symbols generated for the play of the wagering game.

In one embodiment, the persistence game arrangement has a designated quantity of symbol positions. In this embodiment, if the gaming system determines to accumulate a currently generated symbol from a play of a wagering game, the gaming system determines whether each of the symbol positions of the persistence game arrangement includes a previously generated symbol (i.e., is the persistence game arrangement full). If the gaming system determines that each of the symbol positions of the persistence game arrangement includes a previously generated symbol, the gaming system removes at least one symbol from the persistence game arrangement. After removing at least one symbol from the persistence game arrangement or if the gaming system determines that at least one symbol position of the persistence game arrangement is unoccupied, the gaming system causes the persistence game arrangement to display the currently generated symbol from the wagering game. In other words, if the persistence game arrangement is at a maximum capacity of accumulated symbols when the gaming system accumulates additional symbols generated from the wagering game, the symbol accumulation sequence includes the removal of previously accumulated symbols already displayed by the persistence game arrangement to create an area for the additionally generated symbols.

In one embodiment, as part of the symbol evaluation sequence, upon a suitable triggering event, the gaming system automatically evaluates accumulated symbols of the persistence game based on a different type of symbol evaluation from the type of symbol evaluation utilized to determine whether the generated symbols for the wagering game form any winning symbol combinations. In another embodiment, the gaming system determines an award based on the accumulated symbols by applying a modifier, such as a multiplier. In another embodiment, wherein the gaming system collects symbols that are related to symbols generated (as described above), the gaming system evaluates the related symbols to determine an award.

In another embodiment, as part of the symbol evaluation sequence, upon a suitable triggering event, such as if any individual sets of symbol positions of the persistence game arrangement (i.e., a column or row of the persistence game arrangement) is at a maximum capacity of accumulated symbols, the gaming system automatically replaces generated symbols from the wagering game with accumulated symbols from the persistence game arrangement. In this embodiment, the gaming system determines an award by evaluating certain generated symbols for the play of the wagering game in combination with the accumulated symbols that replaced the generated symbols from the wagering game. In other words, the gaming system determines an award based on at least one previously generated symbol and at least one currently generated symbol.

In one embodiment, the suitable trigging event occurs in association with a play of a wagering game or in association with a play of a bonus game. In other words, the accumulated symbols displayed by the persistence game arrangement can be utilized in either one or both a wagering game or a bonus game. This embodiment enables interaction with either one or both of the wagering game and the bonus game by utilizing symbols accumulated in association with the play of a wagering game or bonus game. By providing a persistence game which interacts with a wagering game and bonus game by accumulating and utilizing symbols in either the wagering game or the bonus game, the gaming system provides a greater level of excitement and enjoyment in playing the gaming system and method disclosed herein.

In one embodiment, after the gaming system provides an award for the persistence game, the gaming system does not reset the accumulated symbols of the persistence game arrangement. That is, the accumulated symbols displayed by the persistence game arrangement remain available for use in a future play of the persistence game even after the gaming system provides an award based on those accumulated symbols. In another embodiment, after the gaming system provides an award for the persistence game, the gaming system resets or changes the accumulated symbols already displayed by the persistence game arrangement. In another embodiment, after the occurrence of the triggering event, the gaming system resets or changes the accumulated symbols already displayed by the persistence game arrangement even if the gaming system does not provide an award for the persistence game. Accordingly, this embodiment enables a player to view symbols that are previously generated for plays of a wagering game but will also be evaluated in the future to determine an award for the persistence game. That is, the gaming system disclosed herein enables a player to view a possible future outcome of a persistence game by displaying the symbols that will be utilized for the persistence game upon a triggering event. It should be appreciated that when the gaming system displays high value symbols that will be utilized for the persistence game upon a triggering event, the gaming system provides an increased level of excitement because these high value symbols would provide higher awards than low value symbols.

Additional features and advantages of the present invention are described in, and will be apparent from, the following Detailed Description of the Invention and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
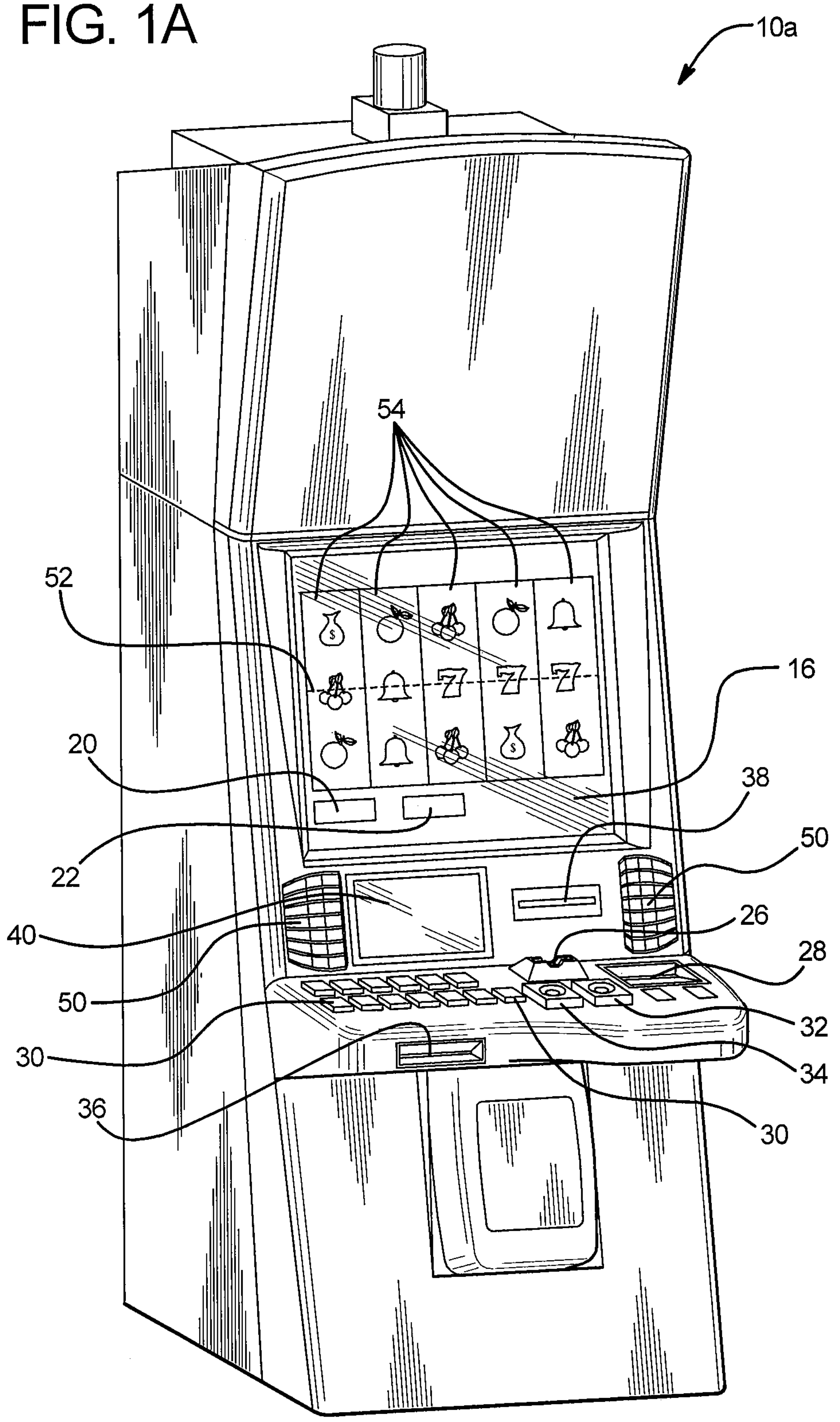
FIG. 1A is a front-side perspective view of one embodiment of the gaming device disclosed herein.
Figure 1B:
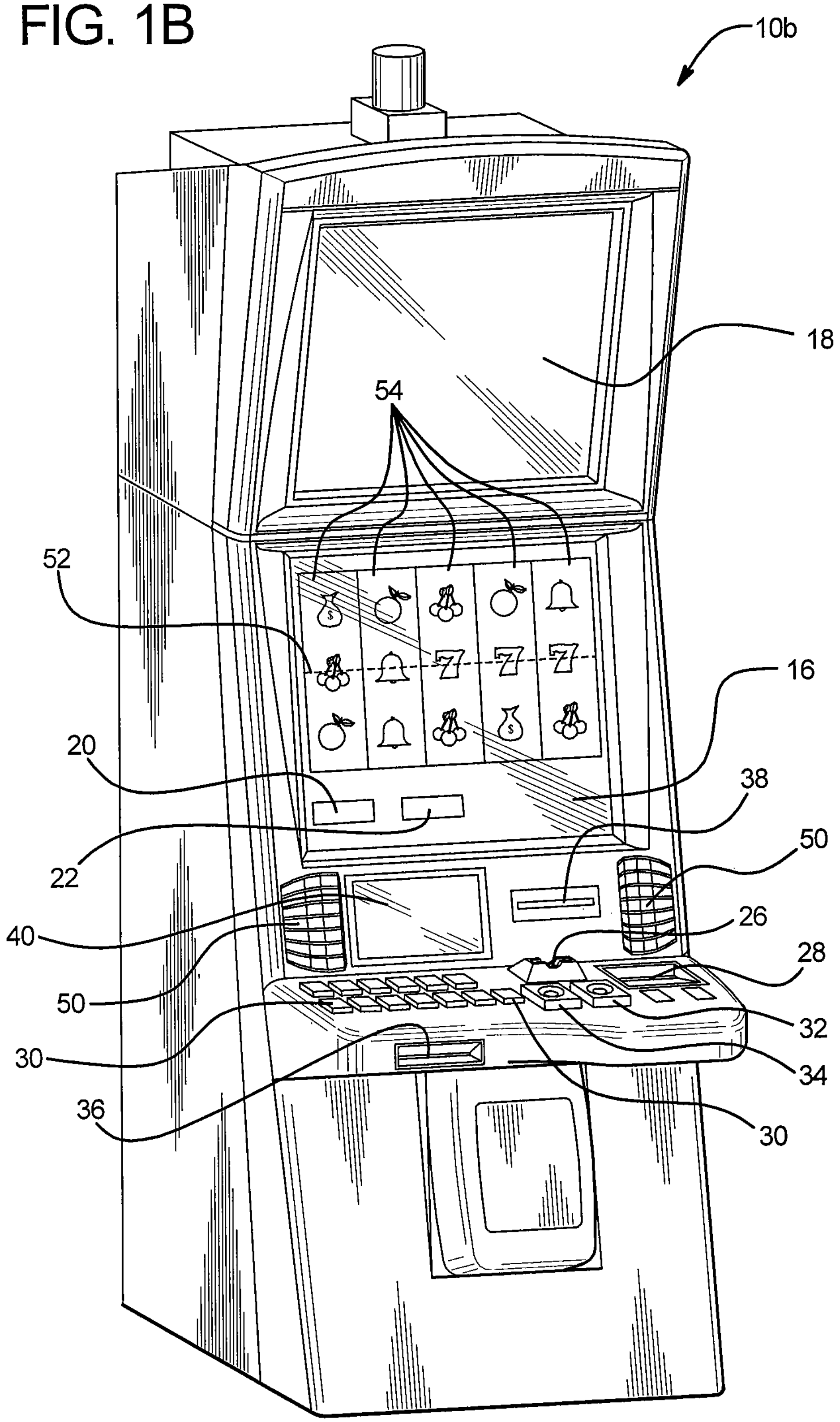
FIG. 1B is a front-side perspective view of another embodiment of the gaming device disclosed herein.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
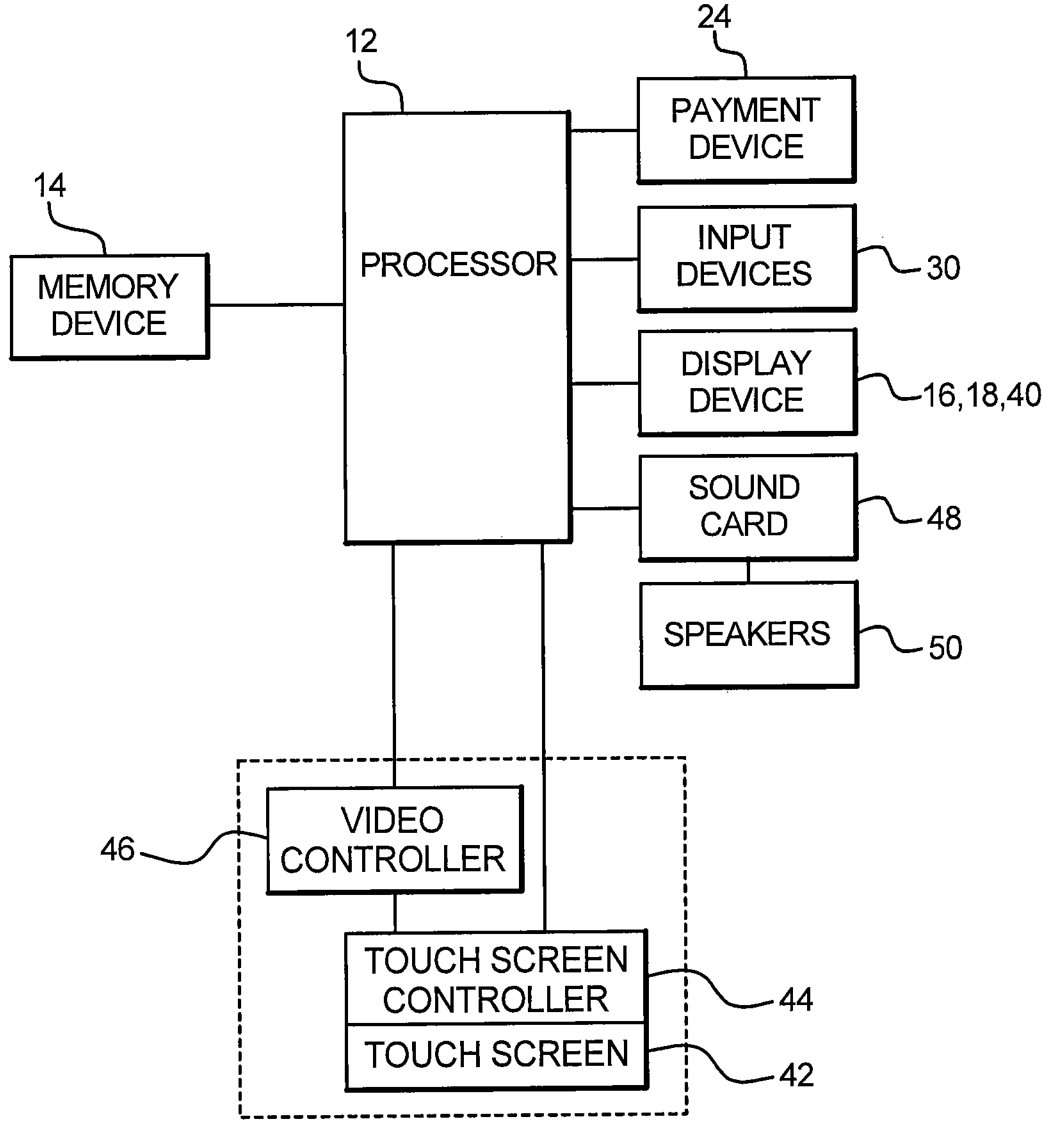
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
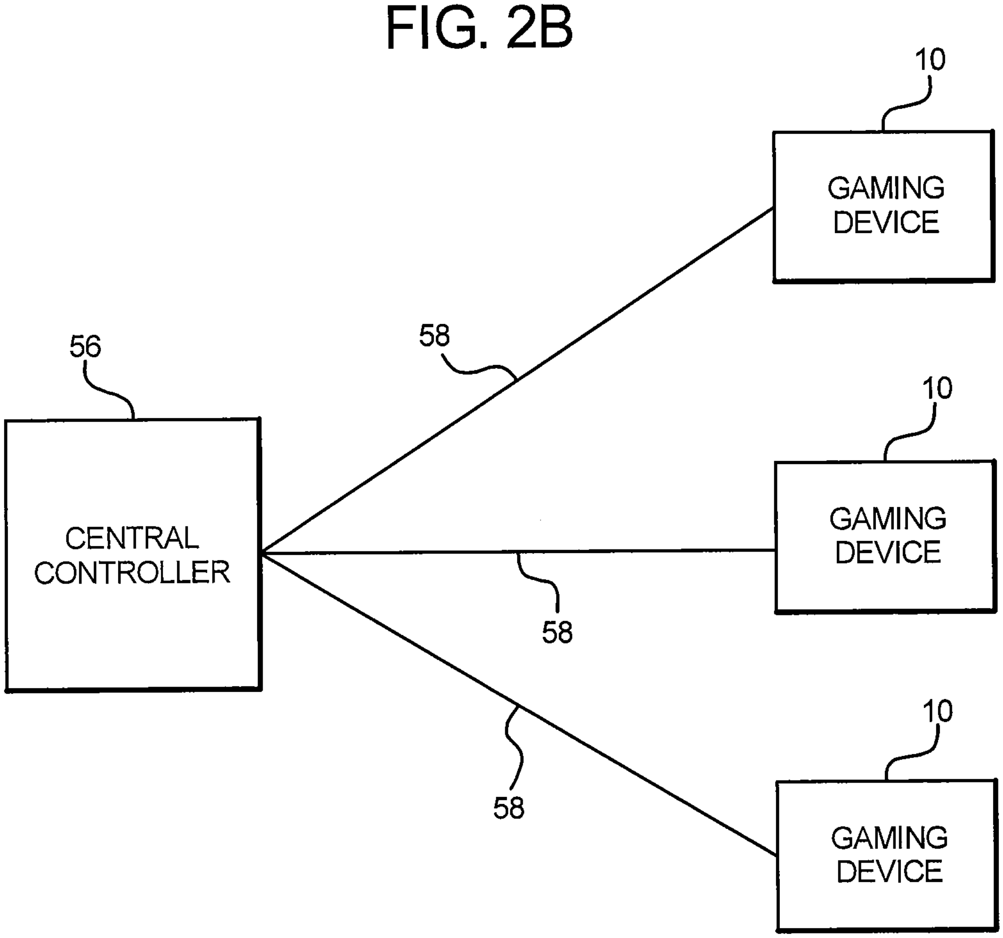
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Persistence Game

Figure 3:
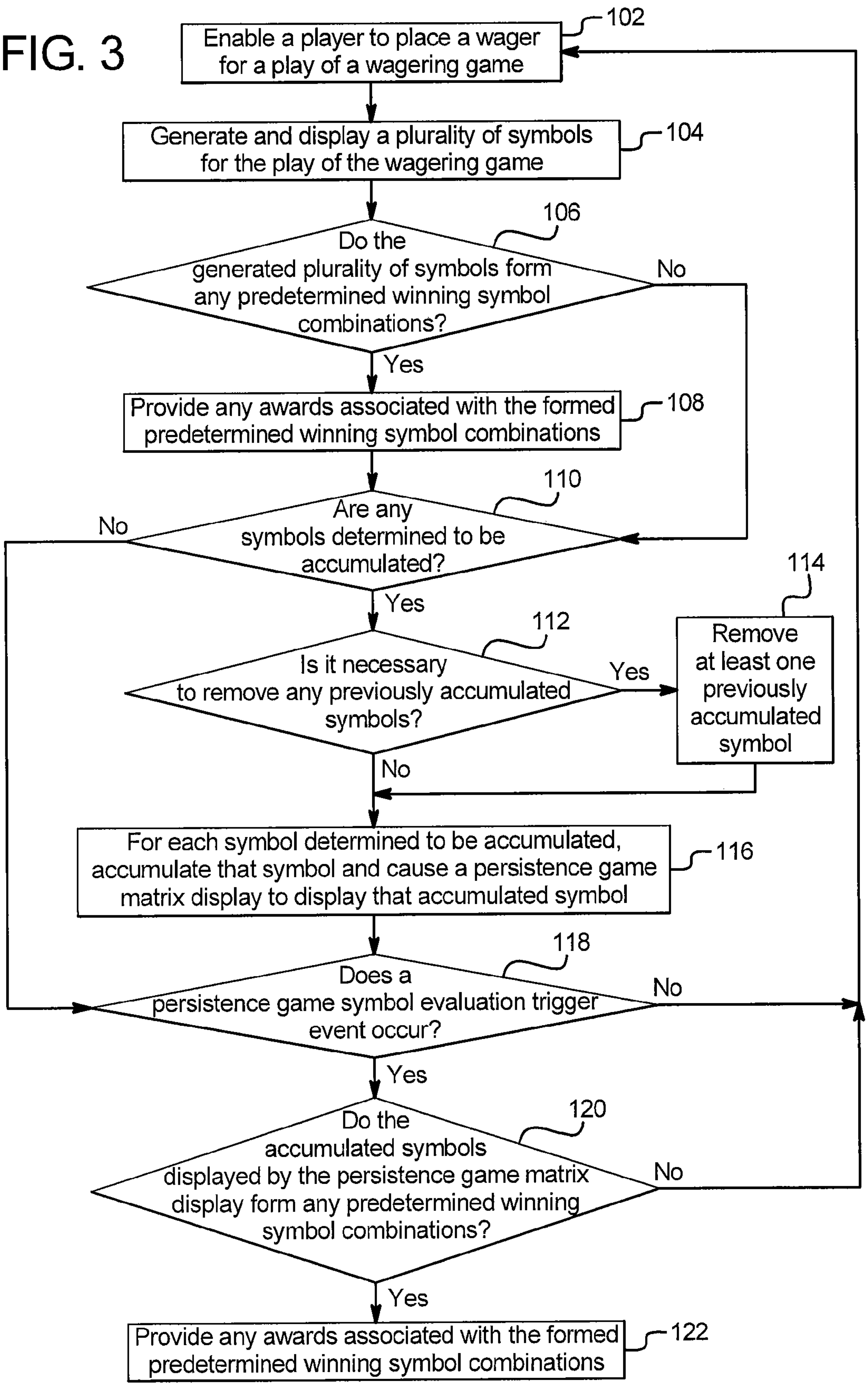
FIG. 3 is a flowchart of one embodiment of the gaming system disclosed herein illustrating an example of providing an award for the persistence game based on the collected symbols of the persistence game after the occurrence of a persistence game symbol evaluation trigger event.

FIG. 3A generally illustrates one embodiment of a method of the present disclosure which employs a symbol accumulation sequence and a symbol evaluation sequence. More specifically, the gaming system generates and displays a plurality of symbols for the play of a wagering game. As part of the symbol accumulation sequence, the gaming system determines whether to accumulate any symbols. For each symbol determined to be accumulated, the gaming system causes a persistence game arrangement, a persistence game matrix or a persistence game matrix display to display that accumulated symbol. As part of the symbol evaluation sequence, upon a suitable triggering event, the gaming system determines whether the accumulated symbols form any winning symbol combinations. The gaming system then provides any awards associated with any determined winning symbol combinations. In other words, the gaming system provides an award for a persistence game based on the collected symbols of the persistence game.

More specifically, the gaming system or gaming device enables a player to place a wager for a play of a wagering game as indicated by block 102. Upon the placement of the wager, the gaming system generates and displays a plurality of symbols for the play of the wagering game as indicated by block 104. As indicated by decision diamond 106, the gaming system determines whether the generated plurality of symbols for the play of the wagering game form any predetermined winning symbol combinations. If the gaming system determines that the generated plurality of symbols for the play of the wagering game form a predetermined winning symbol combination, the gaming system provides an award associated with the formed predetermined winning symbol combination as indicated by block 108.

In addition to providing any awards for any formed predetermined winning symbol combinations, the gaming system determines whether to accumulate any symbols as indicated by decision diamond 110. In one embodiment, the gaming system accumulates symbols generated for a play of a game and causes a persistence game arrangement to display these generated symbols. In another embodiment, the gaming system accumulates symbols different from the generated symbols for a play of a game and causes a persistence game arrangement to display these other symbols. In one such embodiment, the symbols different from the generated symbols are related to the generated symbols, such as higher valued symbols.

In these embodiments, if the gaming system determined to accumulate at least one symbol, the gaming system determines whether it is necessary to remove any previously accumulated symbols as indicated by decision diamond 112. That is, if the persistence game arrangement is at maximum capacity, the gaming system removes symbols to make room for the recently accumulated symbols. In other words, the gaming system removes previously accumulated symbols that are displayed by the persistence game arrangement to create space to display recently accumulated symbols.

If the gaming system determines that it is necessary to remove at least one previously accumulated symbol, the gaming system removes that previously accumulated symbol as shown by block 114. In one embodiment, the gaming system removes previously accumulated symbols in a predetermined order. In one such embodiment, the gaming system removes the previously accumulated symbols in the order of the earliest accumulated symbol to the most recently accumulated symbol. In another such embodiment, the gaming system removes previously accumulated symbols in the order of the most recently accumulated symbol to the earliest accumulated symbol. After the gaming system removes the accumulated symbols or if the gaming system determines that it is not necessary to remove any previously accumulated symbols, for each symbol determined to be accumulated, the gaming system accumulates that symbol and causes a persistence game arrangement to display that accumulated symbol as shown by block 116. In one embodiment, the gaming system accumulates symbols in association with a play of a wagering game or in association with a play of a bonus game. In this embodiment, any symbols accumulated in the wagering game can be utilized for a play of a bonus game and vice versa.

In one embodiment, the gaming system accumulates each generated symbol one time. For example, if the gaming system determines that a generated symbol for the play of the wagering game is part of a plurality of predetermined winning symbol combinations, the gaming system accumulates that generated symbol once. In another embodiment, the gaming system accumulates each symbol a plurality of times. For example, if the gaming system determines that a generated symbol for the play of the wagering game is part of a plurality of different predetermined winning symbol combinations, the gaming system accumulates that generated symbol a plurality of times. In another embodiment, if the gaming system generates a plurality of symbols which form a predetermined winning symbol combination, the gaming system accumulates each of the symbols that form the predetermined winning symbol combination. In another embodiment, if the gaming system generates a plurality of symbols which form a predetermined winning symbol combination, the gaming system accumulates at least one, but not all of the symbols that form the predetermined winning symbol combination.

As indicated by decision diamond 118, in addition to dynamically maintaining the persistence game arrangement, the gaming system determines whether a persistence game symbol evaluation trigger event occurs. In one embodiment, the persistence game symbol evaluation trigger event is based on a displayed event in a play of one or more displayed games. In one such embodiment, the persistence game symbol evaluation trigger event is based on whether the gaming system generates one or more designated symbols for a play of a wagering game. In another embodiment, the persistence game symbol evaluation trigger event occurs independent of any displayed event in any play of any game. In one embodiment, the persistence game symbol evaluation trigger event occurs in association with a play of a wagering game or in association with a play of a bonus game. That is, in this embodiment, the persistence game symbol evaluation trigger event can occur in association with a play of either a wagering game or a bonus game.

If the gaming system determines that the persistence game symbol evaluation trigger event did not occur, the gaming system repeats the process starting at block 102. The player, therefore, has the opportunity to place another wager to initiate a subsequent play of the wagering game. In one embodiment, for the subsequent play of the wagering game, the persistence game arrangement continues to display any previously accumulated symbols. That is, the accumulated symbols displayed by the persistence game arrangement remain available for use in the subsequent play of the wagering game. In other words, the gaming system does not reset the accumulated symbols displayed by the persistence game arrangement. In one embodiment, each of the accumulated symbols remain available for use in the subsequent play of the wagering game. In another embodiment, a plurality of the accumulated symbols remain available for use in the subsequent play of the wagering game. In other words, the gaming system resets certain accumulated symbols, but not all accumulated symbols.

As indicated by decision diamond 120, if the gaming system determines that a persistence game symbol evaluation trigger event has occurred, the gaming system determines whether the accumulated symbols displayed by the persistence game arrangement form any predetermined winning symbol combinations. In one embodiment, the persistence game is associated with a higher average expected payout than the wagering game. In one example embodiment, for the persistence game, the gaming system applies a modifier, such as a multiplier, to any awards resulting from symbol combinations. In another embodiment, the gaming system evaluates the accumulated symbols using a different type of symbol evaluation from the type of symbol evaluation used for the generated symbols of the wagering game. In one such embodiment, the gaming system evaluates the accumulated symbols using a ways to win symbol evaluation and evaluates the generated symbols for a wagering game using a payline symbol evaluation. In another example embodiment, the gaming system evaluates the generated symbols for a play of a wagering game based on a first paytable associated with an average expected payout. On the other hand, in this example embodiment, the gaming system evaluates the accumulated symbols displayed by the persistence game arrangement based on a different second paytable associated with a higher average expected payout than the first paytable.

If the gaming system determines that the accumulated symbols displayed by the persistence game arrangement forms a predetermined winning symbol combination, the gaming system provides an award associated with that formed predetermined winning symbol combination as shown by block 122. If the gaming system determines that the accumulated symbols displayed by the persistence game arrangement do not form a predetermined winning symbol combination, the gaming system repeats the process starting at block 102.

Referring now to FIGS. 4A to 4F, this example embodiment generally shows an example illustrating employing a symbol accumulation sequence which includes, in response to a determination to accumulate generated symbols, the gaming system removing previously accumulated symbols from a persistence game arrangement when the persistence game arrangement is at maximum capacity. As part of the symbol evaluation sequence, the gaming system determines and provides an award for the persistence game based on collected generated symbols that are displayed by the persistence game arrangement. In this example embodiment, the gaming system evaluates the generated symbols for the wagering game based on a first type of symbol evaluation, namely a payline symbol evaluation. On the other hand, upon a persistence game symbol evaluation triggering event, the gaming system evaluates the accumulated symbols using a different second type of symbol evaluation, namely a ways to win symbol evaluation.

Figure 4A:
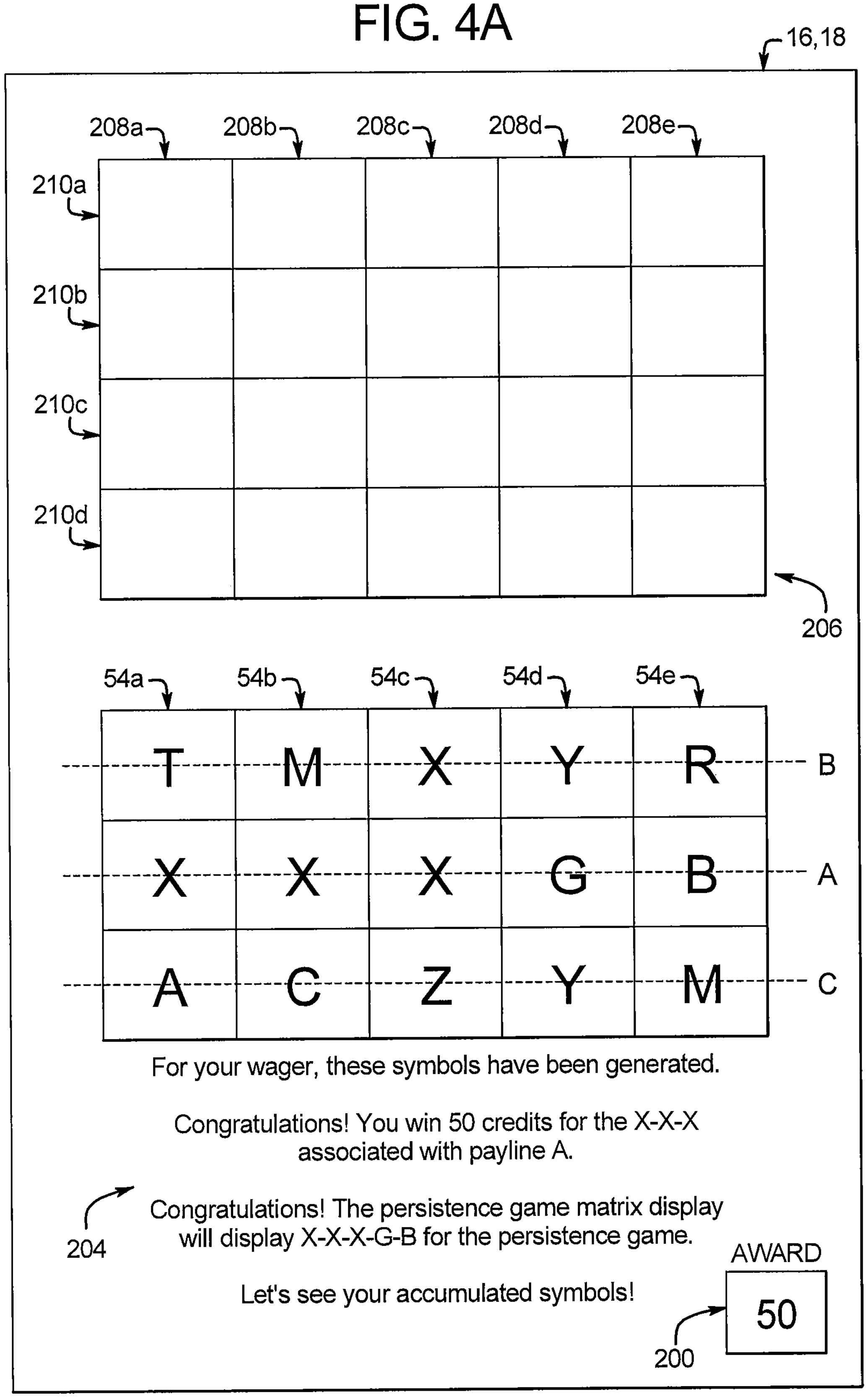
FIGS. 4A, 4B, 4C, 4D, 4E, 4F and 4G are diagrammatic front views of one embodiment of a display device of a gaming system disclosed herein illustrating providing an award for the persistence game based on collected generated symbols that are displayed by a persistence game arrangement, wherein the determined award is based on a type of symbol evaluation different from the wagering game.

As illustrated in FIG. 4A, the gaming system includes a display device 16 or 18 that displays a wagering game, and more particularly a slot game, which includes a plurality of reels 54*a*, 54*b*, 54*c*, 54*d* and 54*e*. The display device 16 or 18 also displays an award meter 200. The award meter 200 displays how much money (i.e., credits) has been won by the player.

The display device 16 or 18 also displays a persistence game arrangement or matrix 206. In this example embodiment, the persistence game arrangement 206 is configured to display a maximum quantity of accumulated symbols. The persistence game arrangement 206 includes a plurality of columns 208*a*, 208*b*, 208*c*, 208*d* and 208*e* and a plurality of rows 210*a*, 210*b*, 210*c* and 210*d* which form a plurality of symbol positions. For example, the persistence game arrangement 206 includes a symbol position formed by the intersection of column 208*a* and row 210*a*. In this example embodiment, each of the columns and rows of the arrangement 206 are configured to display a set of symbols.

In operation of this example embodiment, the gaming system enables a player to place a wager for a play of the wagering game. For each play of the wagering game, the gaming system generates and displays a plurality of symbols. For each wagered on payline, the gaming system determines whether the generated plurality of symbols form any predetermined winning symbol combinations. As illustrated in FIG. 4A, the gaming system generates and displays a plurality of symbols on the reels 54*a* through 54*e* for a play of the wagering game. In this example, the player wagered on paylines A, B and C. The gaming system determines that the generated plurality of symbols on the reels 54*a* through 54*e* form a predetermined winning symbol combination. More specifically, generated symbols X-X-X-G-B associated with payline B form a predetermined winning symbol combination. Based on a payline symbol evaluation, the gaming system determines and provides an award of fifty credits for the generated symbol combination X-X-X-G-B.

In this example embodiment, the gaming system determines whether to accumulate any of the generated plurality of symbols for a play of the wagering game. The gaming system accumulates generated symbols if a designated quantity of generated symbols are generated along a payline. More specifically, in this example embodiment, if the gaming system generates at least three identical symbols along a payline, the gaming system accumulates each of the symbols generated along that payline. As illustrated in FIG. 4A, the gaming system accumulates symbols X-X-X-G-B generated along payline A because the gaming system generated at least three identical symbols (i.e., the three X symbols) along payline A. An appropriate message such as "For you wager, these symbols have been generated. Congratulations! You win 50 credits for the X-X-X associated with payline A. Congratulations! The persistence game arrangement will display X-X-X-G-B for the persistence game. Let's see your accumulated symbols!" is provided to the player visually, such as in the message display 204, or through suitable audio or audiovisual displays.

Figure 4B:
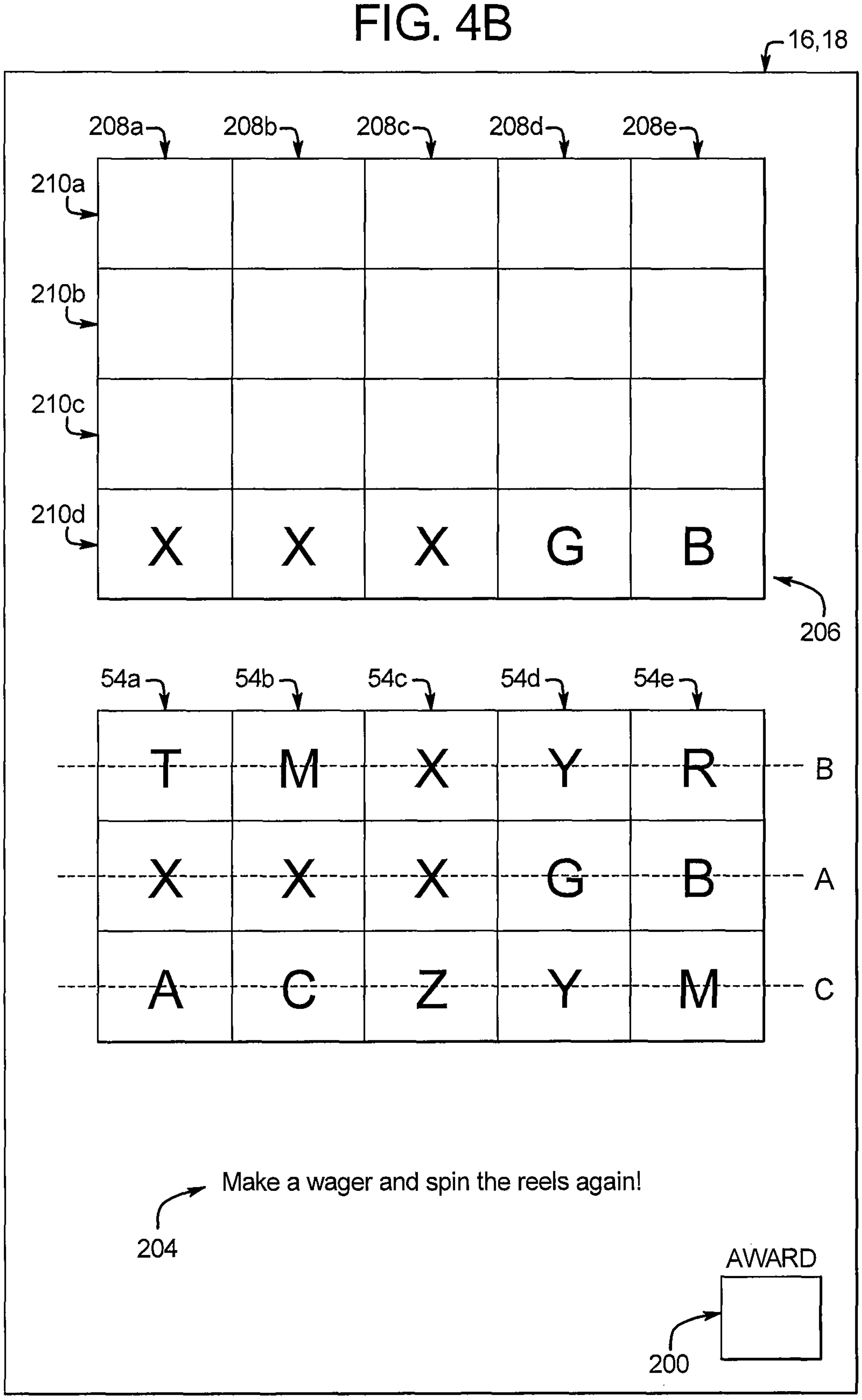

In this example embodiment, for each accumulated symbol, the gaming system causes the persistence game arrangement 206 to display that accumulated symbol. As illustrated in FIG. 4B, the gaming system causes row 210*d* of the persistence game arrangement 206 to display the symbols X-X-X-G-B. An appropriate message such as "Make a wager and spin the reels again!" is provided to the player visually, such as in the message display 204, or through suitable audio or audiovisual displays.

Figure 4C:
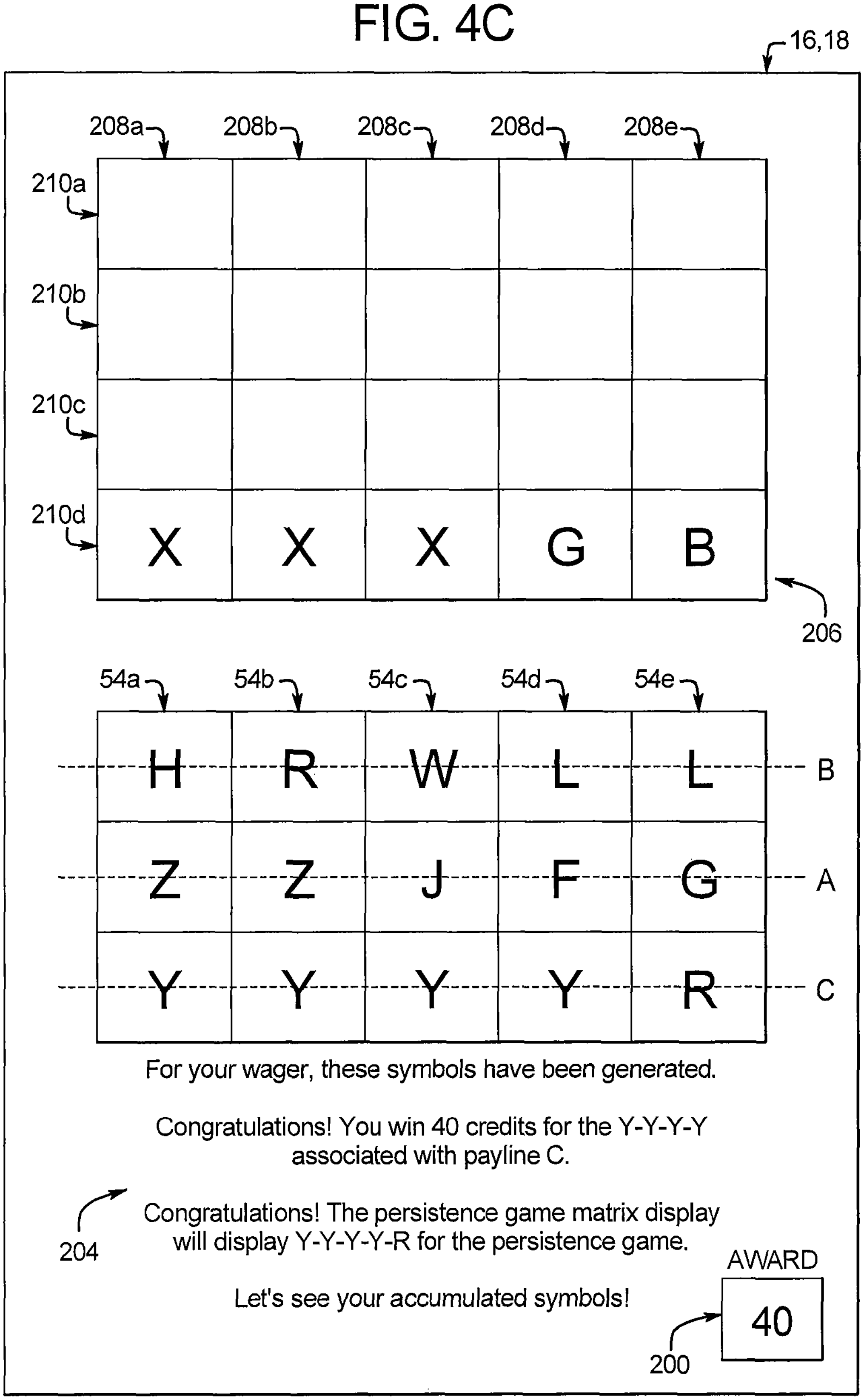

In FIG. 4C, the gaming system generated and displayed a plurality of symbols on the reels 54*a* through 54*e*. The gaming system determines that the generated symbols Y-Y-Y-Y-R associated with payline C form a predetermined winning symbol combination. The award meter 200 shows an award of forty credits, indicating that the gaming system provided an award associated with Y-Y-Y-Y-R. In FIG. 4C, the gaming system also accumulates symbols Y-Y-Y-Y-R generated along payline C because the gaming system generated at least three identical symbols (i.e., the four Y symbols) along payline C. An appropriate message such as "For you wager, these symbols have been generated. Congratulations! You win 40 credits for the Y-Y-Y-Y associated with payline C. Congratulations! The persistence game arrangement will display Y-Y-Y-Y-R for the persistence game. Let's see your accumulated symbols!" is provided to the player visually, such as in the message display 204, or through suitable audio or audiovisual displays.

Figure 4D:
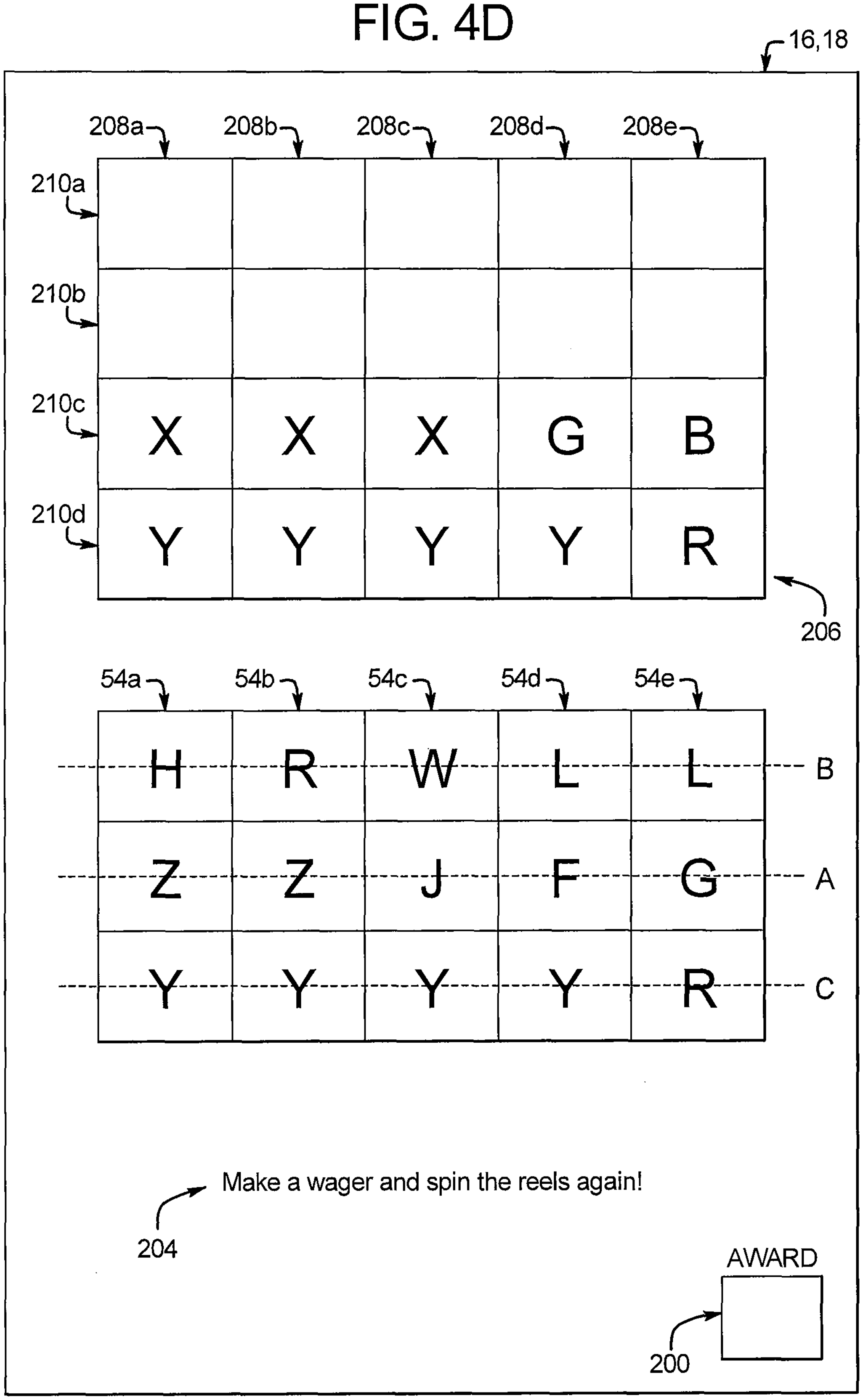

As illustrated in FIG. 4D, for each of the accumulated symbols, the gaming system causes the persistence game arrangement 206 to display that accumulated symbol. More specifically, the gaming system causes row 210*d* of the persistence game arrangement 206 to display the symbols Y-Y-Y-Y-R. By causing row 210*d* to display the symbols Y-Y-Y-Y-R, the gaming system also causes row 210*c* to display the symbols previously displayed by row 210*d* of the persistence game arrangement (i.e., symbols X-X-X-G-B). That is, symbols X-X-X-G-B move up from row 210*d* to 210*c* of the persistence game arrangement 206. An appropriate message such as "Make a wager and spin the reels again!" is provided to the player visually, such as in the message display 204, or through suitable audio or audiovisual displays.

Figure 4E:
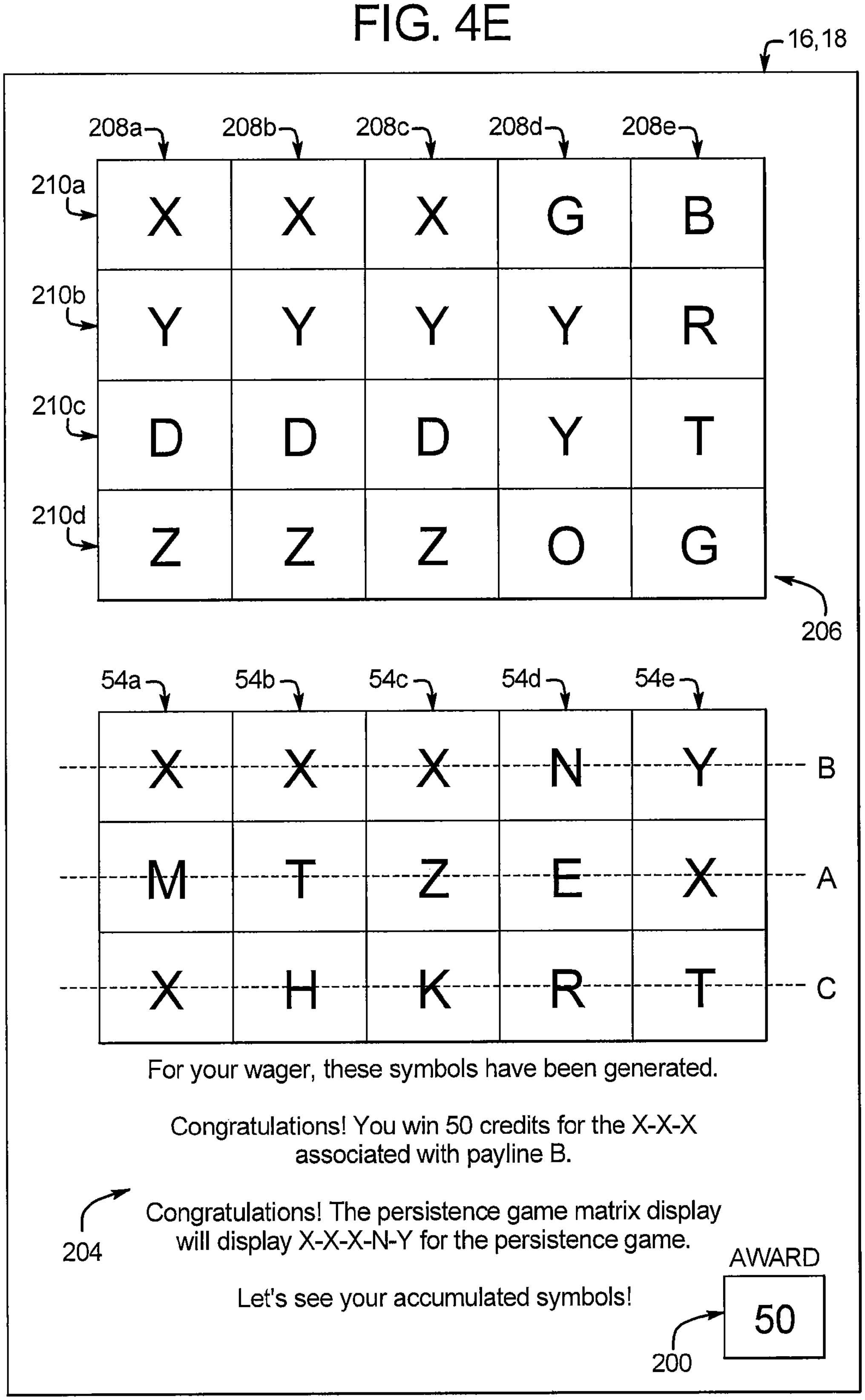

FIG. 4E illustrates a play of the wagering game in which the player had previously accumulated (i.e., before the current wagering game play illustrated in FIG. 4E) a plurality of previously generated symbols. More specifically, the gaming system previously, accumulated generated symbols D-D-D-Y-T (as displayed by row 210*c* of the persistence game arrangement 206) and previously generated symbols Z-Z-Z-O-G (as displayed by row 210*d* of the persistence game arrangement 206). It should be appreciated that in FIG. 4E, the persistence game arrangement 206 has collected the maximum quantity of generated symbols associated with plays of the wagering game. In other words, each of the symbol positions formed by the columns 208*a* to 208*e* and the rows 210*a* to 210*d* display a previously generated symbol. That is, the persistence game arrangement 206 is full.

In FIG. 4E, the gaming system generated and displayed a plurality of symbols on the reels 54*a* through 54*e*. The gaming system determines that the generated symbols X-X-X-N-Y associated with payline B form a predetermined winning symbol combination. The award meter 200 shows an award of fifty credits, indicating that the gaming system provided an award associated with X-X-X-N-Y. The gaming system also determines to accumulate the generated symbol combination X-X-X-N-Y. An appropriate message such as "For you wager, these symbols have been generated. Congratulations! You win 50 credits for the X-X-X associated with payline B. Congratulations! The persistence game arrangement will display X-X-X-N-Y for the persistence game. Let's see your accumulated symbols!" is provided to the player visually, such as in the message display 204, or through suitable audio or audiovisual displays.

Figure 4F:
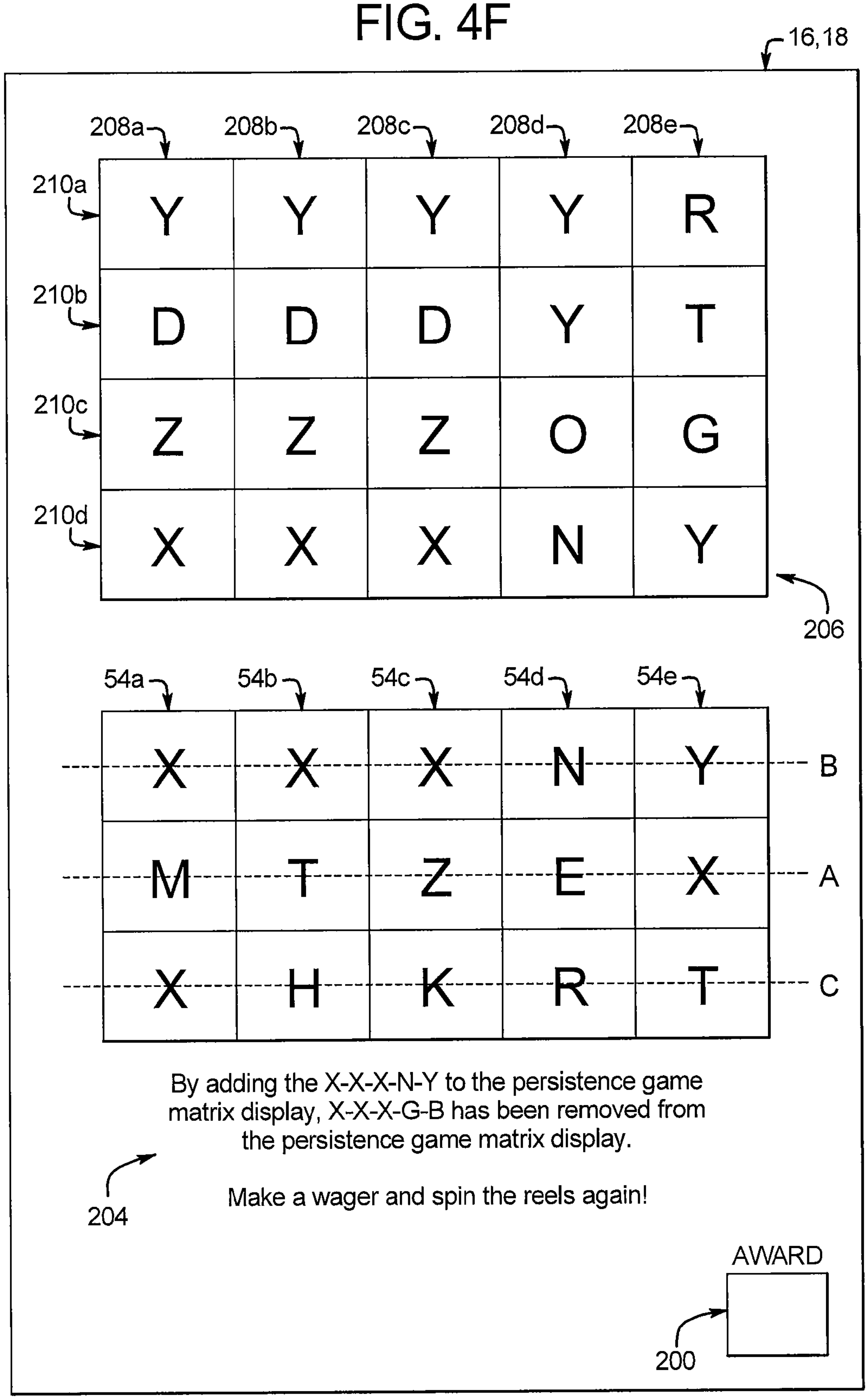

As illustrated in FIG. 4F, for each generated symbol determined to be accumulated (i.e., symbols X-X-X-N-Y), the gaming system causes the persistence game arrangement 206 to display those determined symbols. More specifically, the gaming system causes row 210*d* of the persistence game arrangement 206 to display the symbols X-X-X-N-Y. By causing row 210*d* to display X-X-X-N-Y, the gaming system removes the symbols displayed by row 210*a* of the persistence game arrangement (i.e., symbols X-X-X-G-B). That is, the gaming system created space for the additionally generated symbols X-X-X-N-Y because the persistence game arrangement is full. An appropriate message such as "By adding the X-X-X-N-Y to the persistence game arrangement, X-X-X-G-B has been removed from the persistence game arrangement. Make a wager and spin the reels again!" is provided to the player visually, such as in the message display 204, or through suitable audio or audiovisual displays.

Figure 4G:
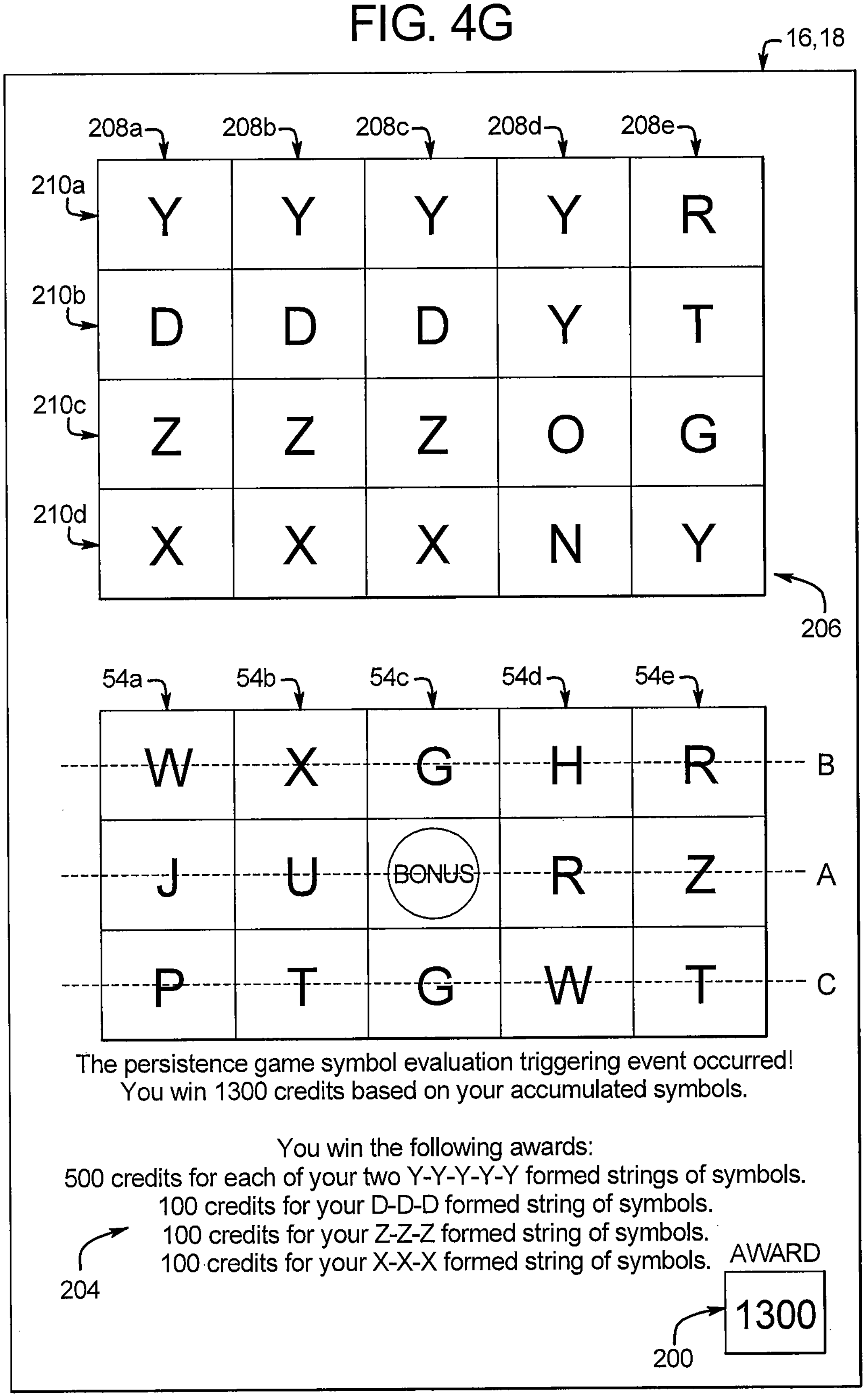

In this example embodiment, for each play of the wagering game, the gaming system determines whether a persistence game symbol evaluation triggering event occurs. In this example embodiment, the persistence game symbol evaluation triggering event is based on a number of designated symbols generated for a play of the wagering game. More specifically, the persistence game symbol evaluation triggering event occurs if the gaming system generates at least one "BONUS" symbol for a play of the wagering game. As illustrated in FIG. 4G, the persistence game symbol evaluation triggering event occurs because the gaming system generated the "BONUS" symbol on reel 54*b*.

In this example embodiment, upon the occurrence of the persistence game symbol evaluation trigger event, the gaming system automatically determines whether the accumulated symbols displayed by the persistence game arrangement 206 form any predetermined winning symbol combinations. In this example, the gaming system evaluates the accumulated symbols based on a different type of symbol evaluation from the type of symbol evaluation utilized to determine whether the generated symbols for the wagering game form any winning symbol combinations. More specifically, in the example, the gaming system automatically evaluates the generated symbols for the wagering game based on a payline symbol evaluation. Alternatively, the gaming system automatically evaluates the accumulated symbols based on a ways to win symbol evaluation. As illustrated in FIG. 4G, because the persistence game symbol evaluation trigger event occurred, the gaming system evaluates the accumulated symbols displayed by the persistence game arrangement 206 based on a ways to win symbol evaluation. In this example, the gaming system determines that the accumulated symbols form five different strings of symbols based on the ways to win symbol evaluation. More specifically, as illustrated in FIG. 4G, the accumulated symbols form: two Y-Y-Y-Y-Y strings of symbols; one D-D-D string of symbols; one Z-Z-Z string of symbols; and one X-X-X string of symbols.

In FIG. 4G, the gaming system provides an award for each of the formed strings of symbols. More specifically, the gaming system provides: five hundred credits for each of the formed Y-Y-Y-Y-Y strings of symbols; one hundred credits for the formed D-D-D string of symbols; one hundred credits for the formed Z-Z-Z string of symbols; and one hundred credits for the formed Z-Z-Z string of symbols. An appropriate message such as "The persistence game symbol evaluation triggering event occurred! You win 1300 credits based on your accumulated symbols. You win the following awards: 500 credits for each of your two Y-Y-Y-Y-Y formed strings of symbols. 100 credits for your D-D-D formed string of symbols. 100 credits for your Z-Z-Z formed string of symbols. 100 credits for your X-X-X formed string of symbols." is provided to the player visually, such as in the message display 204, or through suitable audio or audiovisual displays.

Figure 5:
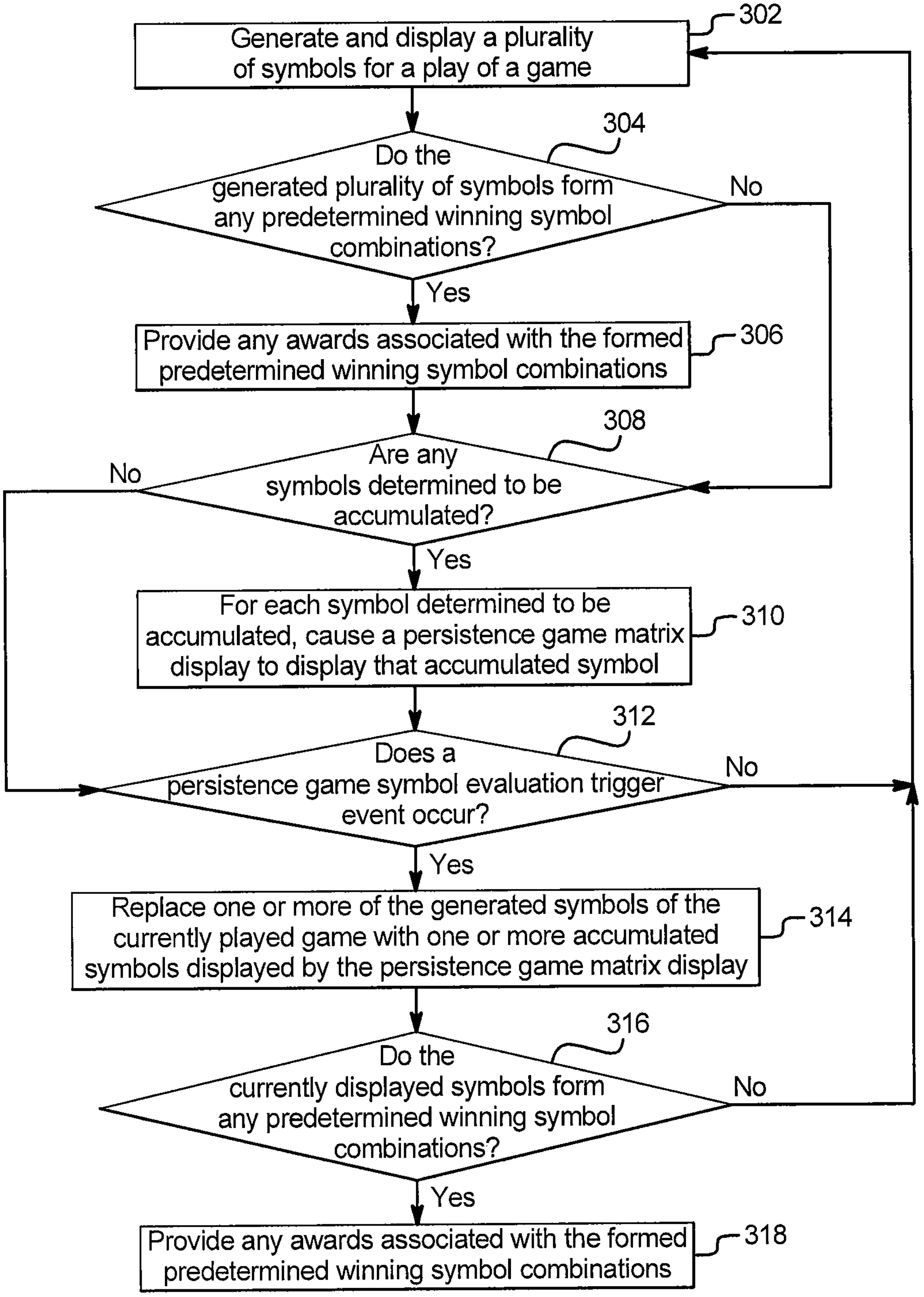
FIG. 5 is a flowchart of one embodiment of the gaming system disclosed herein illustrating an example providing an award based on the collected symbols of the persistence game and the symbols generated for a current play of a game.

FIG. 5 generally illustrates another embodiment of the present disclosure which generates and displays a plurality of symbols for a play of a game (i.e., a wagering game or a bonus game). In this embodiment, as part of the symbol accumulation sequence, the gaming system accumulates symbols generated in association with the play of the wagering game, and subsequently accumulates symbols generated in associated with the play of a subsequently played bonus game. As part of the symbol evaluation sequence, upon a persistence game symbol utilization trigger event, the gaming system automatically replaces at least one generated symbol of the currently played game with at least one accumulated symbol which was previously generated for a previous play of the game. The gaming system determines whether the currently displayed symbols (which include the newly added symbols) include any predetermined winning symbol combinations. The gaming system then provides awards associated with any predetermined winning symbol combinations.

More specifically, the gaming system generates and displays a plurality of symbols for the play of a game as indicated by block 302. As indicated by decision diamond 304, the gaming system determines whether the generated plurality of symbols for the play of the game form any predetermined winning symbol combinations. If the gaming system determines that the generated plurality of symbols for the play of the game form a predetermined winning symbol combination, the gaming system provides an award associated with the formed predetermined winning symbol combination as indicated by block 306.

The gaming system of this embodiment also determines whether to accumulate any symbols as indicated by decision diamond 308 and as described above. For each symbol determined to be accumulated, the gaming system accumulates that symbol and causes a persistence game arrangement to display that accumulated symbol as shown by block 310 and as described above. In one embodiment, the gaming system can accumulate and display symbols in association with a play of a wagering game or in association with a play of a bonus game.

As indicated by decision diamond 312 and as described above, in addition to dynamically maintaining the persistence game display arrangement, the gaming system determines whether a persistence game symbol utilization trigger event occurs. In one embodiment, the persistence game symbol utilization trigger event occurs if any individual sets of symbols of the persistence game arrangement are at a maximum capacity of accumulated symbols.

If the gaming system determines that the persistence game symbol utilization trigger event does not occur, the gaming system repeats the process starting at block 302. As indicated by decision diamond 314, if the gaming system determines that a persistence game symbol utilization trigger event occurred, the gaming system automatically replaces one or more of the generated symbols of the currently played game with one or more accumulated symbols displayed by the persistence game arrangement. In one embodiment, each column (or row) of the persistence game arrangement is associated with, or corresponds to a reel which is employed in a wagering game or bonus game. For example, the persistence game arrangement includes a first column that is associated with a first reel and a second column that is associated with a second reel. In this example, upon the persistence game symbol utilization trigger event, for each of the accumulated symbols displayed by the first column, the gaming system causes that accumulated symbol to replace a separate one of the symbols generated for the first reel. Additionally, upon the persistence game symbol utilization trigger event, for each of the accumulated symbols displayed by the second column, the gaming system causes that accumulated symbol to replace a separate one of the symbols generated for the second reel. That is, in this example, no symbols accumulated and displayed by the first column of the persistence game arrangement can replace any symbols generated for the second reel. In one embodiment, each column of the persistence game arrangement is related to a plurality of reels of the wagering game or bonus game. In one embodiment, a plurality of the columns of the persistence game arrangement are related to a plurality of reels of the wagering game or bonus game.

In one embodiment, the gaming system automatically replaces certain generated symbols of the current play of the game with certain accumulated symbols from the persistence game arrangement. In one embodiment, the gaming system automatically replaces certain sets of generated symbols for a play of a game with certain sets of symbols displayed by a persistence game symbol arrangement. In another embodiment, for each accumulated symbol displayed by the persistence game arrangement, the gaming system causes that accumulated symbol to automatically replace one of the generated symbols for the play of the game. In another embodiment, the gaming system automatically replaces currently generated symbols of the game with symbols associated with the accumulated symbols displayed by the persistence game arrangement. That is, in this embodiment, the gaming system replaces currently generated symbols of the game with symbols that are related to, but different from the accumulated symbols displayed by the persistence game arrangement.

After the gaming system automatically replaces one or more of the currently generated symbols, the gaming system determines whether the currently displayed symbols for the currently played game form any predetermined winning symbol combinations as indicated by decision diamond 316. If the gaming system determines that the currently displayed symbols form a predetermined winning symbol combination, the gaming system provides an award associated with that formed predetermined winning symbol combination as shown by block 318. If the gaming system determines that the currently displayed symbols for the currently played game do not form a predetermined winning symbol combination, the gaming system repeats the process starting at block 302. In one embodiment, for the subsequent play of the game, the persistence game arrangement continues to display any previously accumulated symbols. That is, the accumulated symbols displayed by the persistence game arrangement remain available for use in the subsequent play of the game.

Figure 6:
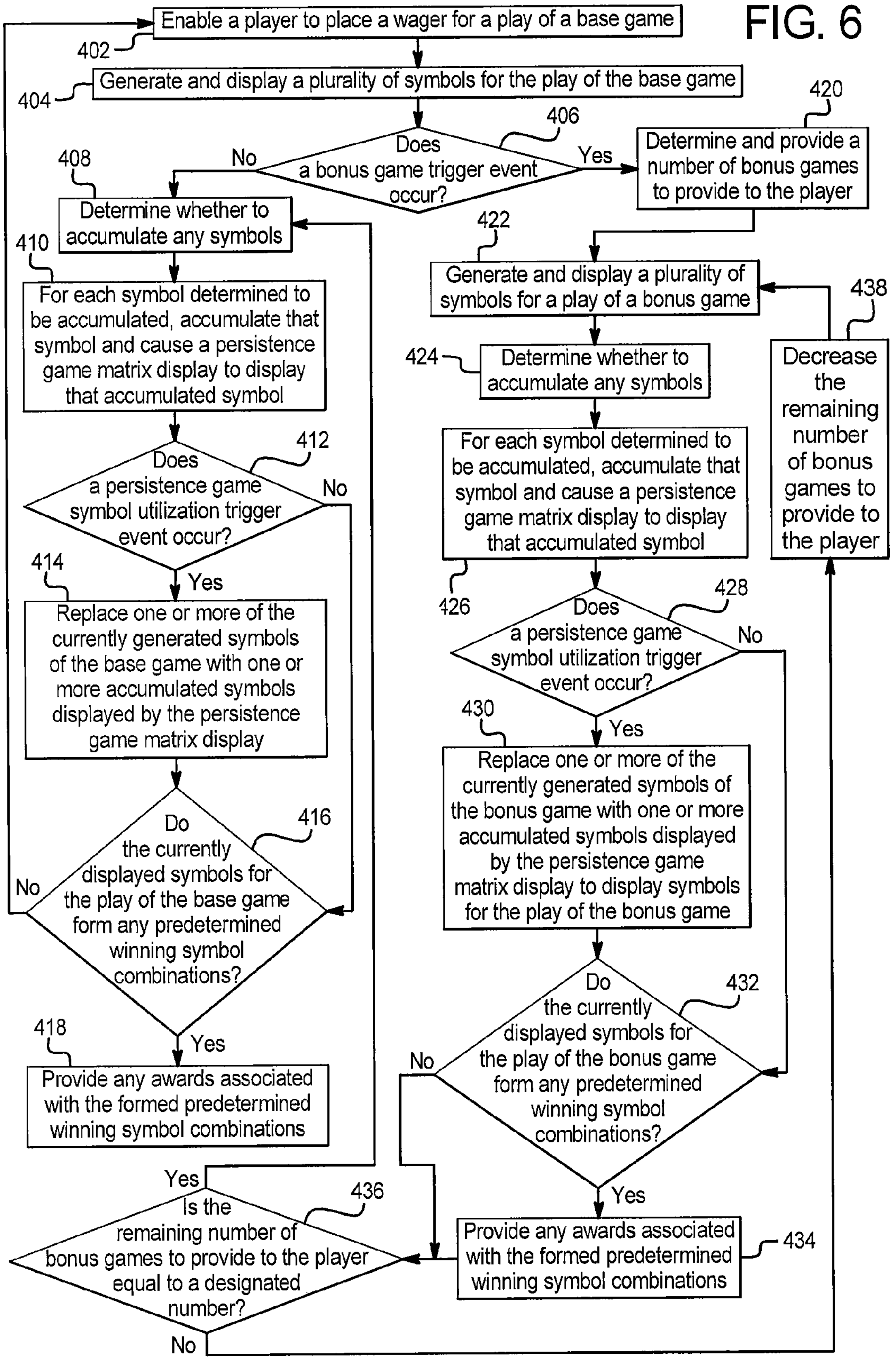
FIG. 6 is a flowchart of one embodiment of the gaming system disclosed herein illustrating an example of the persistence game interacting with a wagering game or bonus game and providing an award based on the collected symbols of the persistence game and the symbols generated for a current play of a wagering game or a bonus game.

FIG. 6 generally illustrates another embodiment of the present disclosure which generates and displays a plurality of symbols for a play of a wagering game or a bonus game. In this embodiment, as part of the symbol accumulation sequence, the gaming system accumulates generated symbols in association with a play of the wagering game or the bonus game. Upon a persistence game symbol utilization trigger event, the gaming system replaces currently generated symbols of the wagering game or bonus game with accumulated symbols which were accumulated in association with a wagering game or bonus game. Thereafter, the gaming system determines whether the currently displayed symbols (which include the newly added symbols) include any predetermined winning symbol combinations. The gaming system then provides awards associated with any predetermined winning symbol combinations.

More specifically, the gaming system or gaming device enables a player to place a wager for a play of a wagering game as indicated by block 402. Upon the placement of the wager, the gaming system generates and displays a plurality of symbols for the play of the wagering game as indicated by block 404.

As indicated by decision diamond 406, the gaming system determines whether a bonus game triggering event occurs. In one embodiment, the bonus game triggering event is based on a displayed event in a play of one or more displayed games. In one such embodiment, the bonus game triggering event is based on whether the gaming system generates one or more designated symbols for a play of the wagering game. In another embodiment, the bonus game triggering event occurs independent of any displayed event in any play of any game.

If the gaming system determines that the bonus game triggering event did not occur, the gaming system determines whether to accumulate any symbols as indicated by block 408. As described above, in one embodiment, the gaming system accumulates generated symbols and, in another embodiment, the gaming system accumulated symbols related to, but different from the generated symbols. In one embodiment, the gaming system determines to accumulate certain designated symbols generated in a play of a wagering game. For each symbol determined to be accumulated, the gaming system accumulates that symbol and causes a persistence game arrangement to display that accumulated symbol as shown by block 410 and as described above.

As indicated by decision diamond 412, the gaming system determines whether a persistence game symbol utilization trigger event occurs. In one embodiment, the persistence game symbol utilization trigger event is based on a displayed event in a play of one or more displayed games. In one such embodiment, the persistence game symbol utilization trigger event is based on whether any individual sets of symbols of the persistence game arrangement is at a maximum capacity of accumulated symbols. For example, the persistence game symbol utilization trigger event occurs when any persistence game arrangement column displays a maximum amount of accumulated symbols. In another embodiment, the persistence game symbol utilization trigger event occurs independent of any displayed event in any play of any game.

As indicated by block 414 and as described above, if the gaming system determines that a persistence game symbol utilization trigger event has occurred, the gaming system replaces one or more of the currently generated symbols of the wagering game with one or more accumulated symbols displayed by the persistence game arrangement.

After the gaming system replaces one or more of the currently generated symbols, the gaming system determines whether the currently displayed symbols for the play of the wagering game form any predetermined winning symbol combinations as indicated by decision diamond 416. If the gaming system determines that the currently displayed symbols for the play of the wagering game form a predetermined winning symbol combination, the gaming system provides an award associated with that formed predetermined winning symbol combination as shown by block 418. If the gaming system determines that the currently displayed symbols for the play of a wagering game do not form a predetermined winning symbol combination, the gaming system repeats the process starting at block 402. In one embodiment, for the subsequent play of the wagering game, the persistence game arrangement continues to display any previously accumulated symbols as described above. That is, the accumulated symbols displayed by the persistence game arrangement remain available for use in the subsequent play of the wagering game.

On the other hand, if the gaming system determines that the bonus triggering event did occur, the gaming system determines and provides a number of bonus games to provide to the player as indicated by block 420. In one embodiment, the bonus games include a plurality of free spin games. After the gaming system determines and provides the number of bonus games, the gaming system generates and displays a plurality of symbols for a play of a bonus game as indicated by block 422.

After the gaming system generates and displays the plurality of symbols for the play of the bonus game, the gaming system determines whether to accumulate any symbols as indicated by block 424 and as described above. In one embodiment, the gaming system determines whether to accumulate symbols for the play of the bonus game based on a different type of symbol evaluation from the type of symbol evaluation utilized to determine whether to accumulate any symbols for a play of the wagering game. In one example embodiment, for a play of a wagering game, the gaming system accumulates symbols based on a first symbol evaluation of whether any "bar" symbols are generated. That is, in this example, for the play of the wagering game, the gaming system accumulates any generated "bar" symbols. In this example embodiment, for the play of a bonus game, the gaming system accumulates symbols based on a second symbol evaluation of whether any "bar" symbols or any "cherry" symbols are generated. That is, for the play of the bonus game, the gaming system accumulates any generated "bar" symbols or any generated "cherry" symbols. In other words, in this example embodiment, the gaming system accumulates more types of symbols for a play of the bonus game than a play of a wagering game.

For each symbol determined to be accumulated, the gaming system accumulates that symbol and causes a persistence game arrangement to display that accumulated symbol as shown by block 426 and as described above. As indicated by decision diamond 428 and as described above, the gaming system determines whether a persistence game symbol utilization trigger event occurs.

As indicated by block 430 and as described above, if the gaming system determines that a persistence game symbol utilization trigger event has occurred, the gaming system replaces one or more of the currently generated symbols of the bonus game with one or more accumulated symbols displayed by the persistence game arrangement to display symbols for the play of the bonus game.

After the gaming system replaces one or more of the currently generated symbols, the gaming system determines whether the currently displayed symbols for the play of a bonus game form any predetermined winning symbol combinations as indicated by decision diamond 432 and as described above. If the gaming system determines that the currently displayed symbols for the play of a bonus game form a predetermined winning symbol combination, the gaming system provides an award associated with that formed predetermined winning symbol combination as shown by block 434 and as described above.

After the gaming system provides the award or if the gaming system determines that the currently displayed symbols for the play of a wagering game do not form a predetermined winning symbol combination, the gaming system determines whether the remaining number of bonus games to provide to the player is equal to a designated number as indicated by decision diamond 436. In one embodiment, the designated number is zero.

If the gaming system determines that the remaining number of bonus games to provide to the play is not equal to the designated number, the gaming system decreases the remaining number of bonus games to provide to the player as indicated by block 438. After the gaming system decreases the remaining number of bonus games, the gaming system repeats the process starting at block 422. The player, therefore, has the opportunity to initiate a subsequent play of the bonus game. In one embodiment, for the subsequent play of the bonus game, the persistence game arrangement continues to display any previously accumulated symbols as described above. That is, the accumulated symbols displayed by the persistence game arrangement remain available for use in the subsequent play of the bonus game. In other words, the gaming system does not reset the accumulated symbols displayed by the persistence game arrangement. In another embodiment, a plurality of the accumulated symbols remain available for use in the subsequent play of the bonus game. In other words, the gaming system resets certain accumulated symbols, but not all accumulated symbols for the subsequent play of the bonus game.

If the gaming system determines that the remaining number of bonus games to provide to the play is equal to a designated number, the gaming system determines whether to accumulate any symbols for a subsequent play of the wagering game as indicated by block 408. In one embodiment, for the subsequent play of the wagering game, the persistence game arrangement continues to display any symbols accumulated in one or more plays of the bonus game as described above. That is, the accumulated symbols that were accumulated in the bonus game remain available for use in the subsequent play of the wagering game. In other words, the gaming system does not reset the accumulated symbols displayed by the persistence game arrangement for the subsequent play of the wagering game. In another embodiment, a plurality of the accumulated symbols remain available for use in the subsequent play of the wagering game. In other words, the gaming system resets certain accumulated symbols, but not all accumulated symbols for the subsequent play of the wagering game.

Referring now to FIGS. 7A to 7K, this example embodiment generally shows an example illustrating providing the player with ten free spin bonus games upon a suitable bonus trigger event. In this example, as part of the symbol accumulation sequence, the gaming system accumulates generated symbols from a wagering game or a bonus game. The gaming system accumulates more types of symbols for a play of the bonus game than the types of symbols accumulated for a play of the wagering game. In this example, the symbols that are accumulated for plays of the wagering game are carried over for the provided plays of the bonus game and vice versa. In this example, if any column of the persistence game arrangement accumulates a maximum quantity of symbols, the gaming system replaces generated symbols of the currently played game with accumulated symbols displayed by the persistence game arrangement. Thereafter, the gaming system determines whether any of the displayed symbols form any winning symbol combinations and provides any awards associated with any determined winning symbol combinations.

Figure 7A:
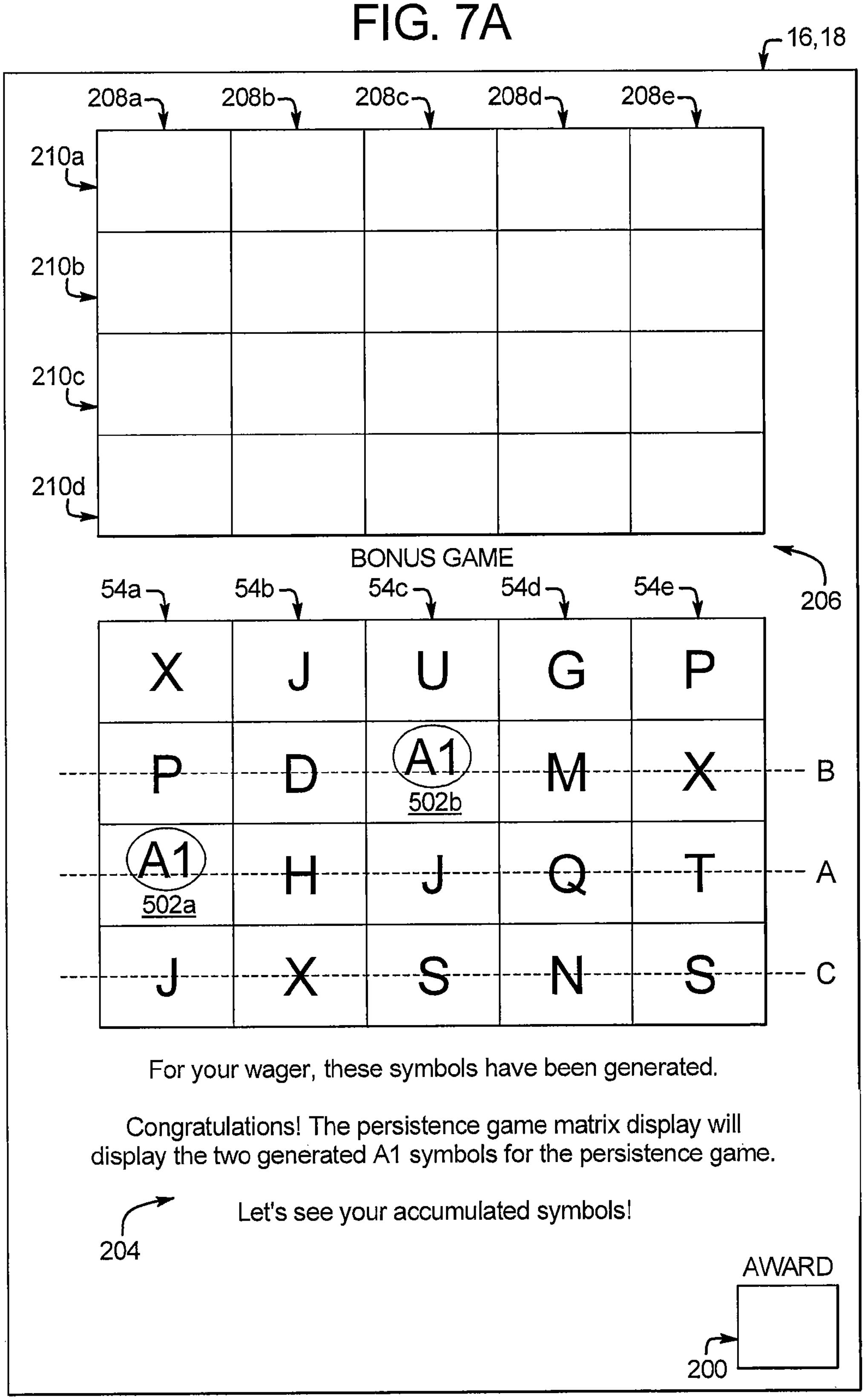
FIGS. 7A, 7B, 7C, 7D, 7E, 7F, 7G, 7H, 7I, 7J and 7K are diagrammatic front views of one embodiment of a display device of a gaming system disclosed herein illustrating accumulating generated symbols in association with a play of a wagering game or a bonus game and, upon a persistence game symbol utilization trigger event, providing an award based on collected generated symbols and symbols currently generated for a play of a wagering game.

More specifically, as illustrated in FIG. 7A, the gaming system includes a display device 16 or 18 that displays a wagering game, and more particularly a slot game, which includes a plurality of reels 54*a*, 54*b*, 54*c*, 54*d* and 54*e*. The display device 16 or 18 also displays an award meter 200. The display device 16 or 18 also displays a persistence game arrangement or matrix 206. In this example embodiment, the persistence game arrangement 206 is configured to display a maximum quantity of accumulated symbols. The persistence game arrangement 206 includes a plurality of columns 208*a*, 208*b*, 208*c*, 208*d* and 208*e* and a plurality of rows 210*a*, 210*b*, 210*c* and 210*d* which form a plurality of symbol positions.

In operation of this example embodiment, the gaming system enables a player to place a wager for a play of the wagering game. For each play of the wagering game, the gaming system generates and displays a plurality of symbols. For each wagered on payline, the gaming system determines whether the generated plurality of symbols form any predetermined winning symbol combinations. As illustrated in FIG. 7A, the gaming system generates and displays a plurality of symbols on the reels 54*a* through 54*e* for a play of the wagering game. In this example, the player wagered on paylines A, B and C.

In this example embodiment, the gaming system determines whether to accumulate any of the generated plurality of symbols of the wagering game. In this example, the gaming system accumulates generated symbols if certain designated symbols are generated for a play of the bonus game. More specifically, for the wagering game, the gaming system accumulates each generated "A1" symbol. As illustrated in FIG. 4A, the gaming system accumulates generated symbols "A1" 502*a* and "A1" 502*b*. An appropriate message such as "For you wager, these symbols have been generated. Congratulations! The persistence game arrangement will display the two generated A1 symbols for the persistence game. Let's see your accumulated symbols!" is provided to the player visually, such as in the message display 204, or through suitable audio or audiovisual displays.

Figure 7B:
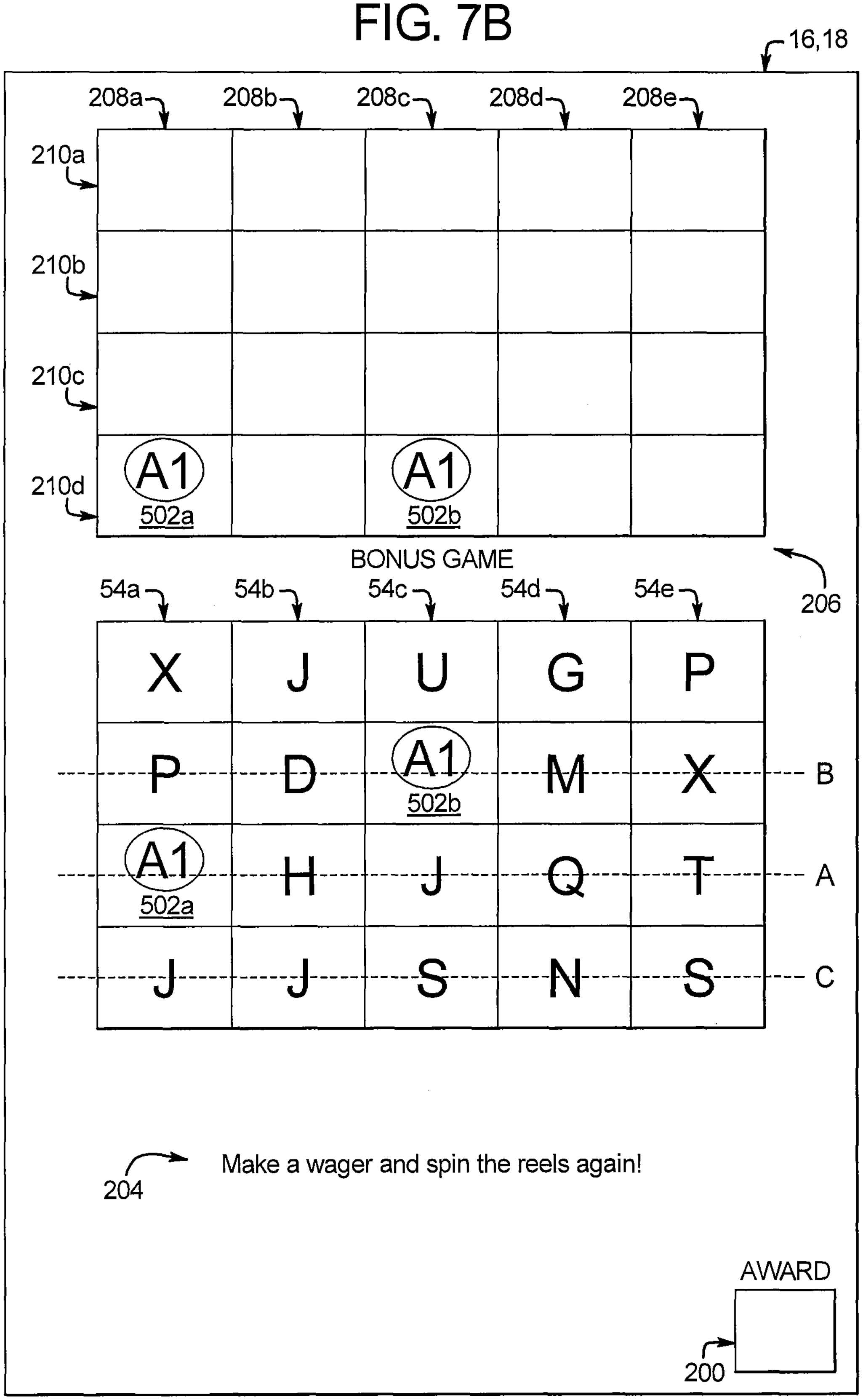

In this example embodiment, for each accumulated symbol, the gaming system causes the persistence game arrangement 206 to display that accumulated symbol. In this example: column 208*a* is associated with reel 54*a*; column 208*b* is associated with reel 54*b*; column 208*c* is associated with reel 54*c*; column 208*d* is associated with reel 54*d*; and column 208*e* is associated with reel 54*e*. For each generated symbols determined to be accumulated, that symbol is displayed by a certain column of the persistence game arrangement based on which reel generated that symbol. More specifically, for symbols generated by reel 54*a* which are determined to be accumulated, the gaming system causes column 208*a* to display these generated symbols. For symbols generated by reel 54*b* which are determined to be accumulated, the gaming system causes column 208*b* to display these generated symbols. For symbols generated by reel 54*c* which are determined to be accumulated, the gaming system causes column 208*c* to display these generated symbols. For symbols generated by reel 54*d* which are determined to be accumulated, the gaming system causes column 208*d* to display these generated symbols. For symbols generated by reel 54*e* which are determined to be accumulated, the gaming system causes column 208*e* to display these generated symbols. As illustrated in FIG. 7B, the gaming system causes: (i) column 208*a*, row 210*d* of the persistence game arrangement 206 to display the "A1" 502*a* symbol; and (ii) column 208*c*, row 210*d* of the persistence game arrangement 206 to display the "A1" symbol 502*b*. An appropriate message such as "Make a wager and spin the reels again!" is provided to the player visually, such as in the message display 204, or through suitable audio or audiovisual displays.

Figure 7C:
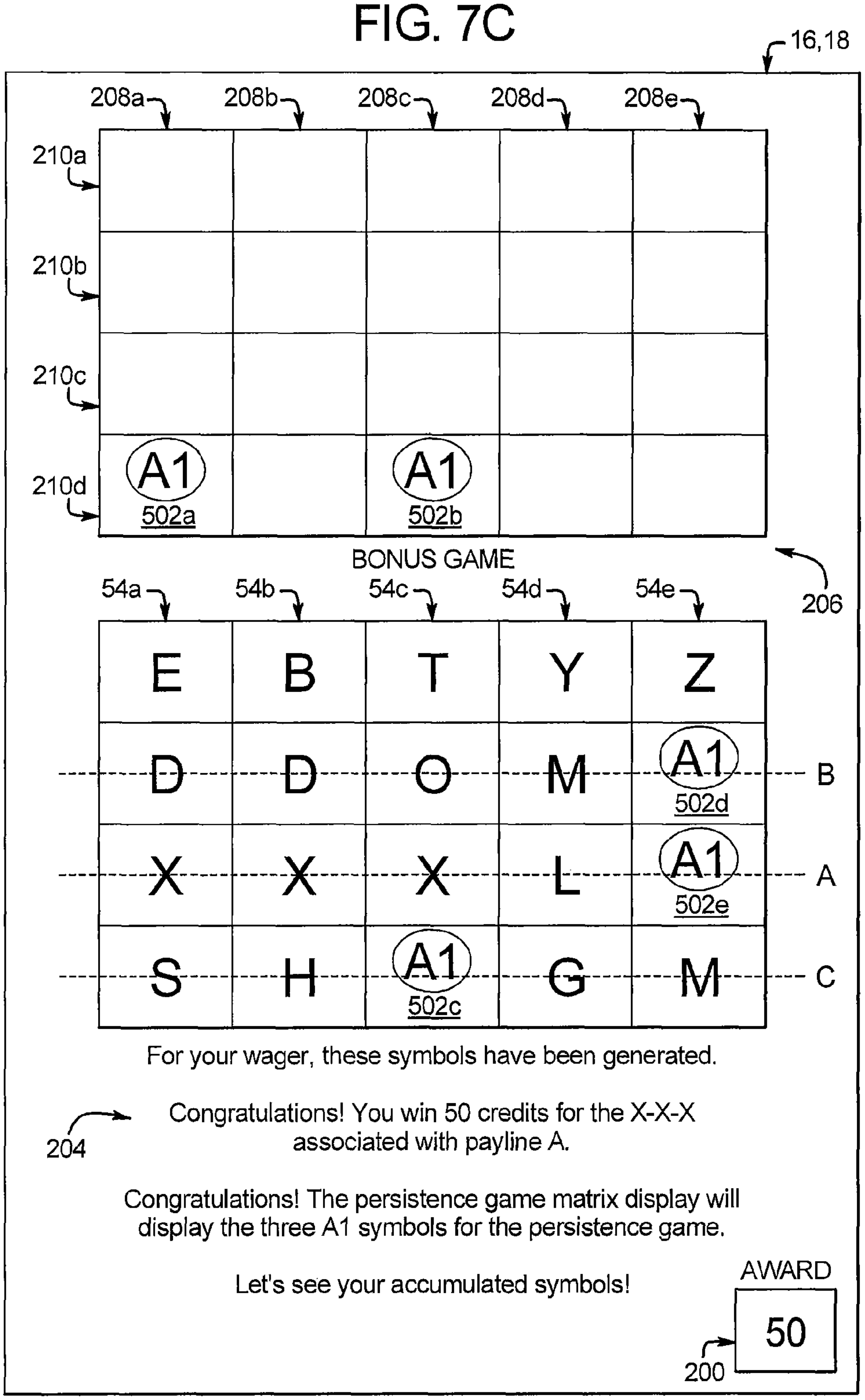

In FIG. 7C, the gaming system generated and displayed a plurality of symbols on the reels 54*a* through 54*e*. The gaming system determines that the generated symbols X-X-X-L-A1 associated with payline A form a predetermined winning symbol combination. The award meter 200 shows an award of fifty credits, indicating that the gaming system provided an award associated with the generated symbols X-X-X-L-A1. The gaming system also determines to accumulate the generated symbols "A1" 502*c*, "A1" 502*d* and "A1" 502*e*. An appropriate message such as "For you wager, these symbols have been generated. Congratulations! You win 50 credits for the X-X-X associated with payline A. Congratulations! The persistence game arrangement will display the three A1 symbols for the persistence game. Let's see your accumulated symbols!" is provided to the player visually, such as in the message display 204, or through suitable audio or audiovisual displays.

Figure 7D:
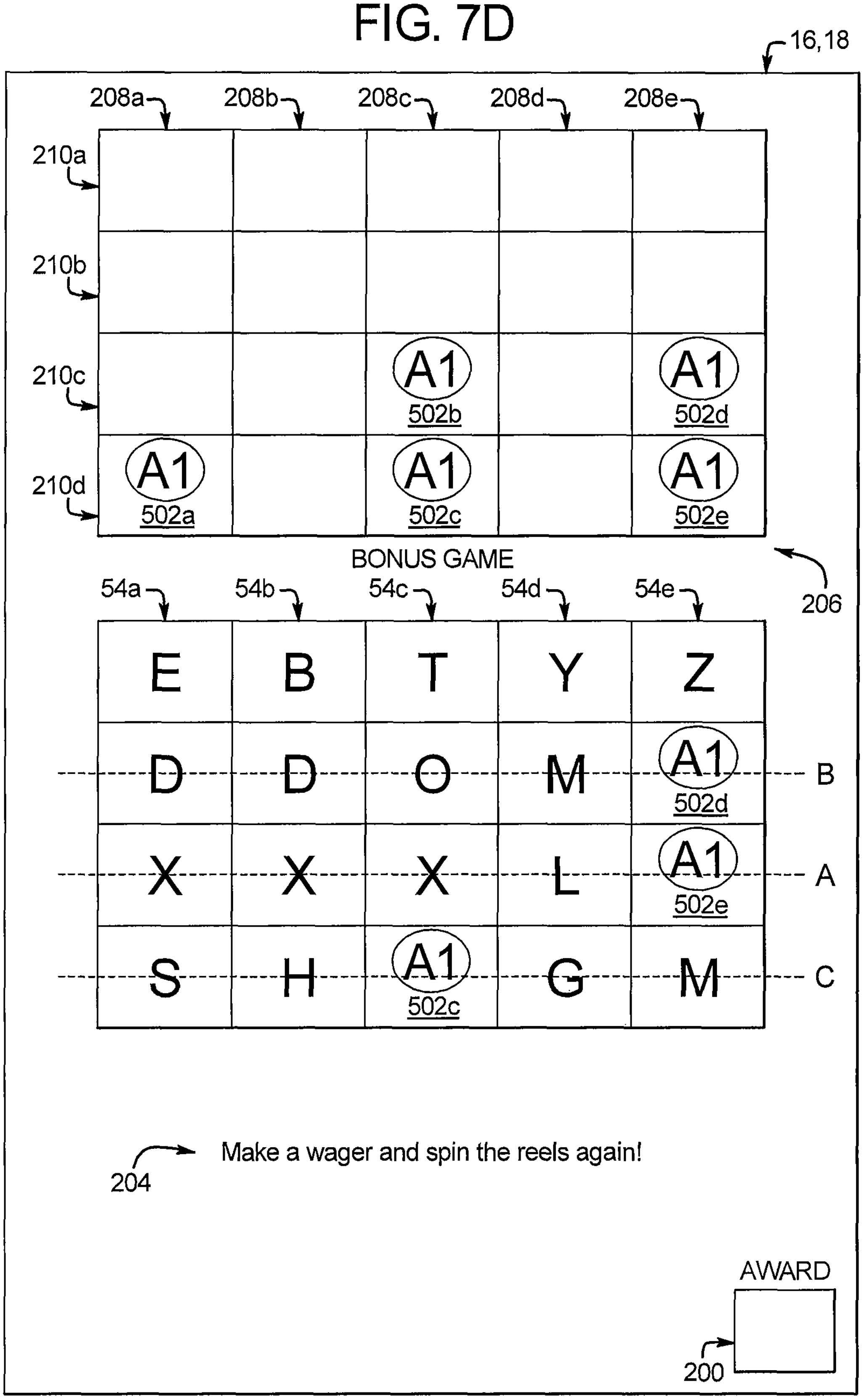

As illustrated in FIG. 7D, for each of the accumulated symbols, the gaming system causes the persistence game arrangement 206 to display that accumulated symbol. More specifically, the gaming system causes: (i) column 208*c*, row 210*d* of the persistence game arrangement 206 to display the "A1" symbol 502*c*; (ii) column 208*e*, row 210*c* of the persistence game arrangement 206 to display the "A1" symbol 502*d*; and (iii) column 208*e*, row 210*d* of the persistence game arrangement 206 to display the "A1" symbol 502*e*. By causing column 208*c*, row 210*d* of the persistence game arrangement 206 to display the "A1" symbol 502*c*, the gaming system also causes column 208*c*, row 210*c* of the persistence game arrangement 206 to display the "A1" symbol 502*b* which was previously displayed by column 208*c*, row 210*d* of the persistence game arrangement 206. That is, the "A1" symbol 502*b* moved up from row 210*d* of the persistence game arrangement 206 to row 210*c*. An appropriate message such as "Make a wager and spin the reels again!" is provided to the player visually, such as in the message display 204, or through suitable audio or audiovisual displays.

Figure 7E:
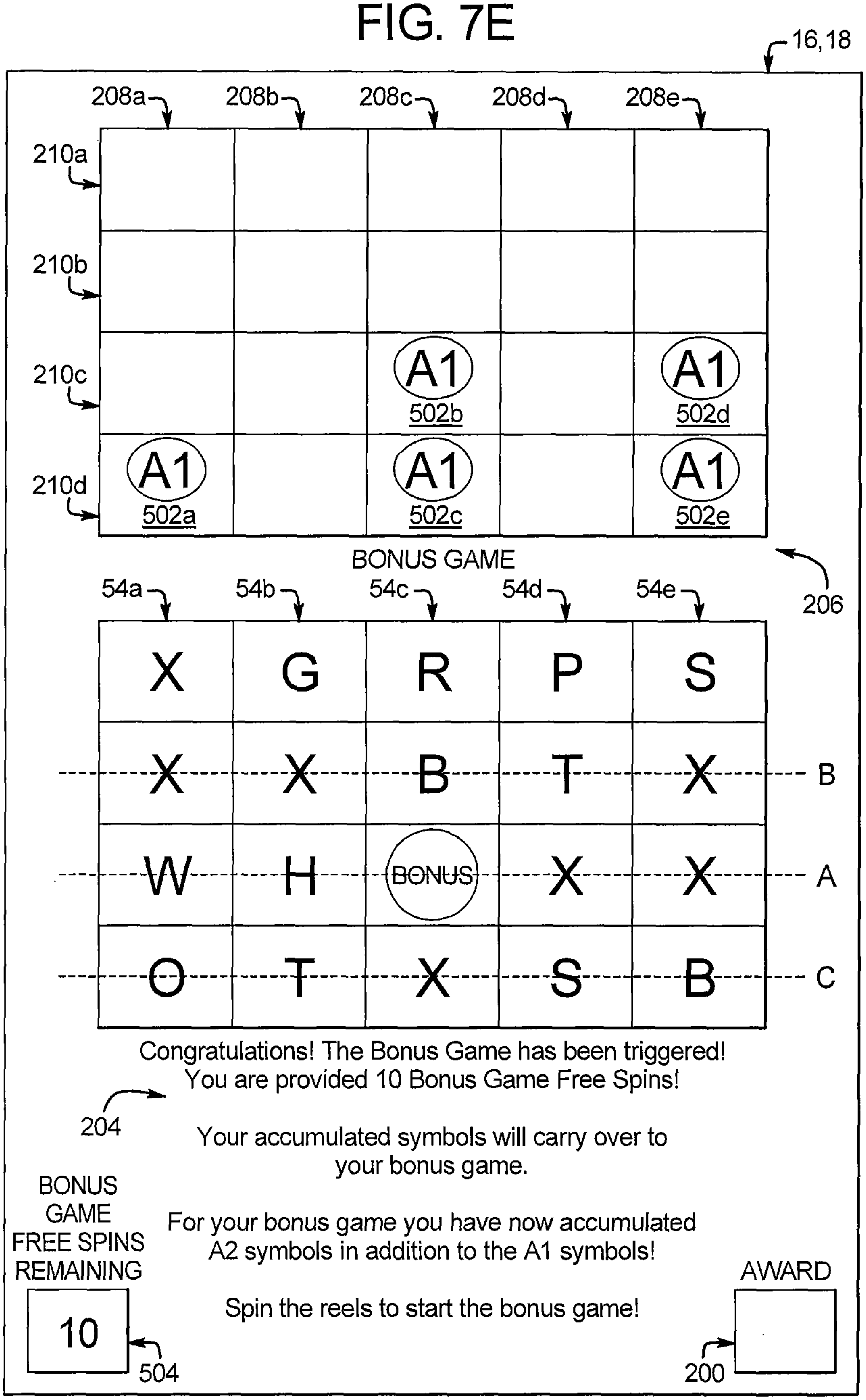

Referring now to FIG. 7E, in this example embodiment, upon a bonus game triggering event, the gaming system determines and provides a number of bonus games to the player. In this example embodiment, the bonus game triggering event occurs if the gaming system generates at least one "BONUS" symbol for a play of the wagering game. As illustrated in FIG. 7E, the generated symbols include a bonus triggering event (i.e., the generation of the "BONUS" symbol). The "BONUS" symbol on reel 54*c* triggers a bonus game of ten bonus game free spins as indicated by the message display 204. In this example, when the gaming system provides the bonus game, the display device provides a bonus game free spins remaining meter 210. The bonus game free spins remaining meter 210 displays how many bonus game free spins remain. In this example, the gaming system provides the player with ten bonus game free spins as shown by the bonus game free spins remaining meter 210.

In this example embodiment, the previously accumulated symbols that were accumulated and displayed in association with the wagering game remain available for plays of the bonus game free spins provided to the player. That is, the persistence game arrangement 206 continues to display the accumulated symbols, 502*a*, 502*b*, 502*c* and 502*d* for the bonus game.

In this example embodiment, the gaming system determines whether to accumulate any of the generated plurality of symbols of the bonus game. The gaming system accumulates generated symbols if certain designated symbols are generated for a play of the bonus game. More specifically, for the bonus game, the gaming system accumulates generated "A1" symbols and generated "A2" symbols. In other words, for the bonus game, the gaming system can accumulate more types of symbols than the types of symbols available to be accumulated for the wagering game. An appropriate message such as "Congratulations! The Bonus Game has been triggered! You are provided 10 Bonus Game Free Spins! Your accumulated symbols will carry over to your bonus game. For your bonus game you can now accumulate A2 symbols in addition to the A1 symbols! Spin the reels to start the bonus game!" is provided to the player visually, such as in the message display 204, or through suitable audio or audiovisual displays.

Figure 7F:
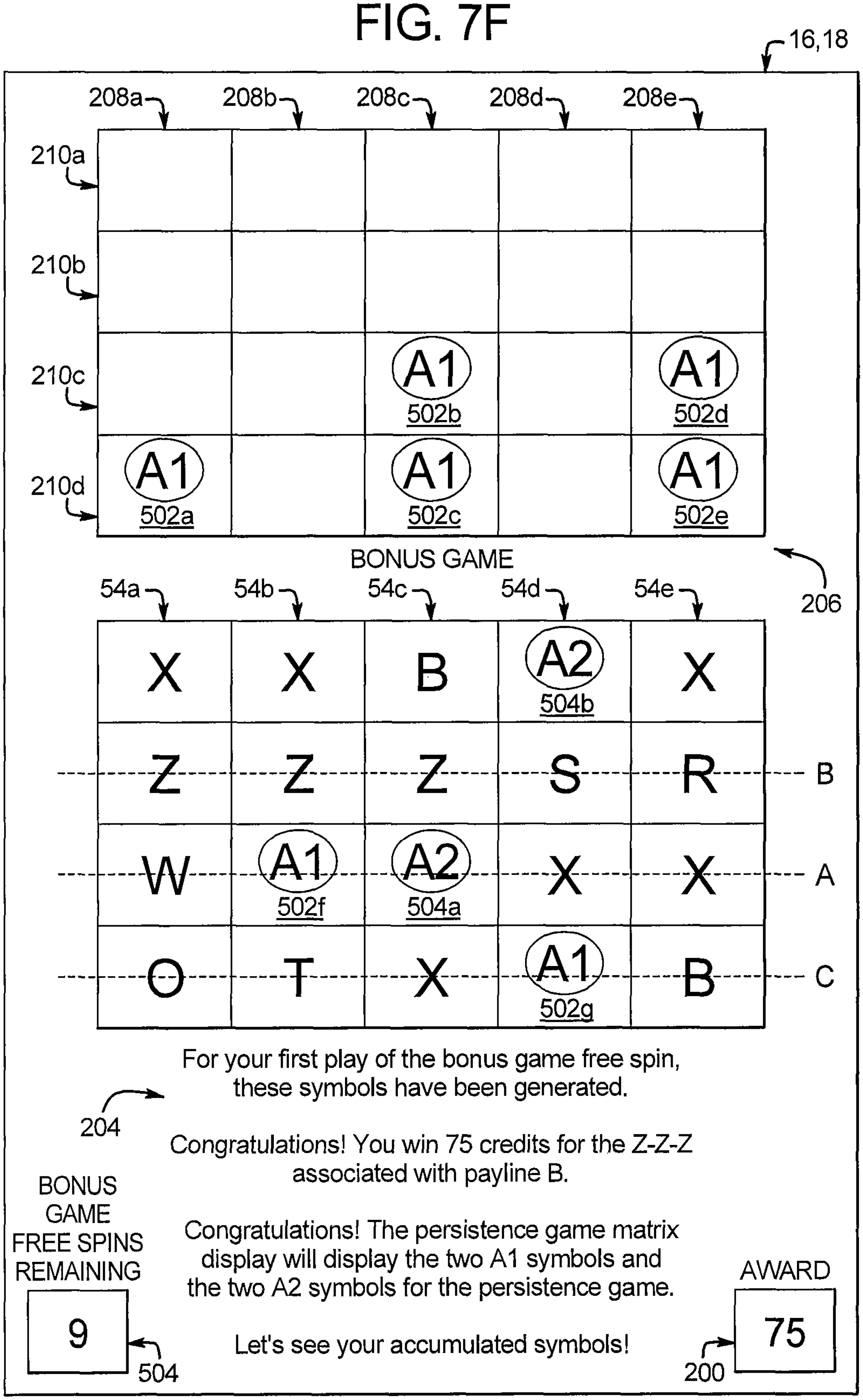

As illustrated in FIG. 7F, the gaming system generates and displays a plurality of symbols on the reels 54*a* through 54*e* for the first free spin play of the bonus game. In this example embodiment, the gaming system determines to accumulate the "A1" symbol 502*f*, the "A2" symbol 504*a*, the "A2" symbol 504*b* and the "A1" symbol 502*g*. Additionally, in this example, the gaming system determines that the generated plurality of symbols on the reels 54*a* through 54*e* form a predetermined winning symbol combination. More specifically, generated symbols Z-Z-Z associated with payline B form a predetermined winning symbol combination. Based on a payline symbol evaluation, the gaming system determines and provides an award of seventy-five credits for the generated symbol combination Z-Z-Z. The award meter 200 shows an award of seventy-five credits, indicating that the gaming system provided an award associated with the Z-Z-Z symbol combination.

The gaming system also determines whether the remaining number of bonus games to provide to the player equals a designated number. In this example, the designated number is zero. In other words, the gaming system determines whether to provide any more bonus game free spins to the player. As illustrated in FIG. 7F, because the bonus game free spins remaining to provide to the player is nine, the gaming system determines to provide another bonus game free spin and decreases the remaining number of bonus game free spins to provide to the player. The bonus game free spins meter 504 shows the number nine. An appropriate message such as "For your first play of the bonus game free spin, these symbols have been generated. Congratulations! You win 75 credits for the Z-Z-Z associated with payline B. Congratulations! The persistence game arrangement will display the two A1 symbols and the two A2 symbols of the persistence game. Let's see your accumulated symbols!" is provided to the player visually, such as in the message display 204, or through suitable audio or audiovisual displays.

Figure 7G:
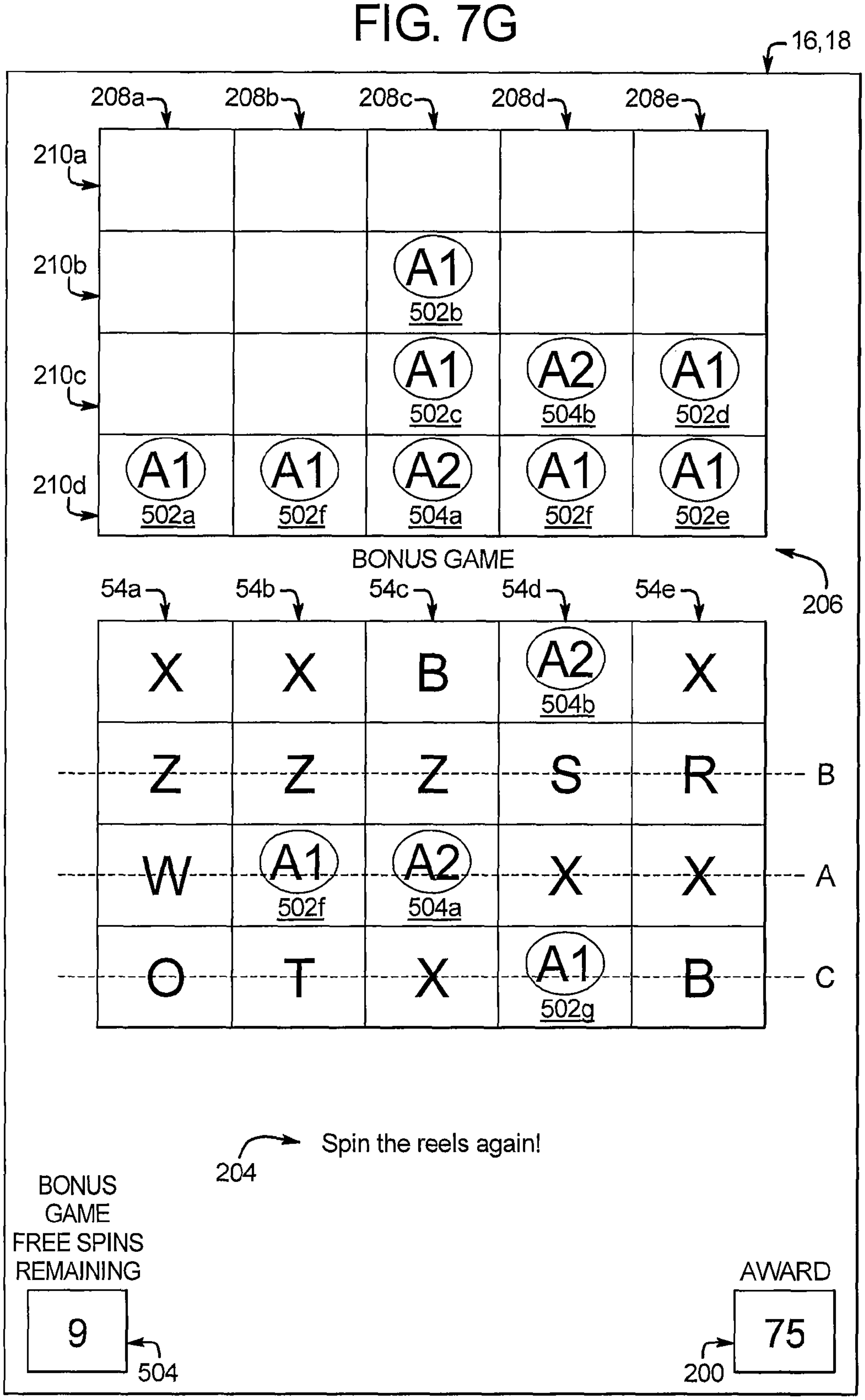

As illustrated in FIG. 7G, for each of the accumulated symbols, the gaming system causes the persistence game arrangement 206 to display that accumulated symbol. More specifically, the gaming system causes: (i) column 208*b*, row 210*d* of the persistence game arrangement 206 to display the "A1" symbol 502*f*; (ii) column 208*c*, row 210*d* to display the "A2" symbol 504*a*; (iii) column 208*d*, row 210*c* to display the "A2" symbol 504*b*; and column 208*d*, row 210*d* to display the "A1" symbol 502*g*. By causing column 208*c*, row 210*d* to display the "A2" symbol 504*a* the gaming system also causes: (i) column 208*c*, row 210*b* of the persistence game arrangement 206 to display the "A1" symbol 502*b*; and (ii) column 208*c*, row 210*c* to display the "A1" symbol 502*c*. That is, for column 208*c*, the "A1" symbol 502*b* and the "A1" symbol 502*c* moved up a row. An appropriate message such as "Spin the reels again!" is provided to the player visually, such as in the message display 204, or through suitable audio or audiovisual displays.

Figure 7H:
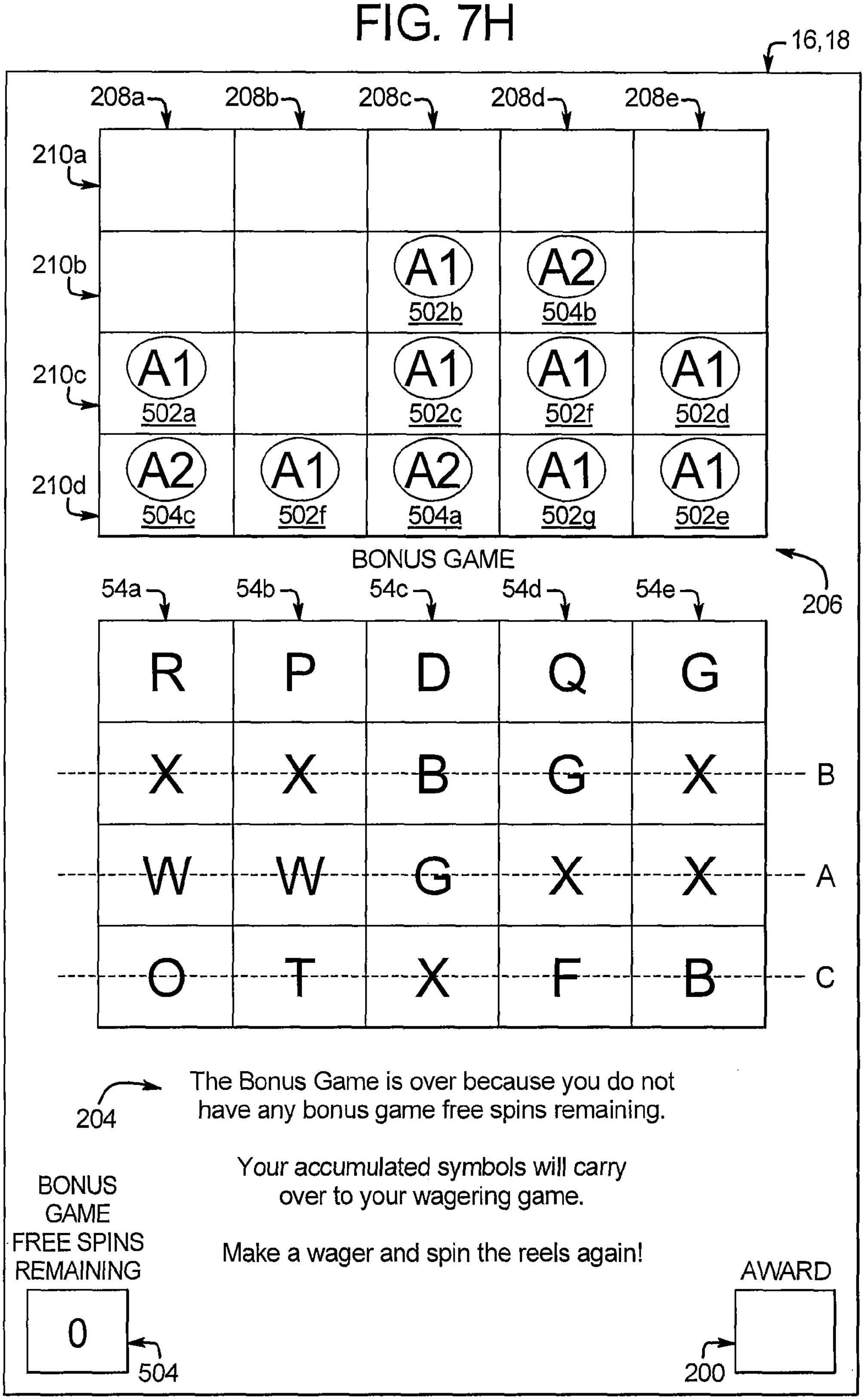

FIG. 7H illustrates a play of the bonus game in which the player had previously accumulated generated symbols (i.e., before the current bonus game play illustrated in FIG. 7H). More specifically, the gaming system previously accumulated: (i) the "A2" symbol 504*c* (as displayed by column 208*a*, row 210*d* of the persistence game arrangement 206); and (ii) the "A1" symbol 502*g* (as displayed by column 208*d*, row 210*d* of the persistence game arrangement 206).

In FIG. 7H, the gaming system generates and displays a plurality of symbols on the reels 54*a* though 54*e* for the last free spin play of the bonus game. It should be appreciated that in FIG. 7H, the gaming system determined not to accumulate any generated symbols and also determined that the generated symbols do not include any predetermined winning symbol combinations. An appropriate message such as "The Bonus Game is over because you do not have any bonus game free spins remaining. Your accumulated symbols will carry over to your wagering game. Make a wager and spin the reels again!" is provided to the player visually, such as in the message display 204, or through suitable audio or audiovisual displays.

Figure 7I:
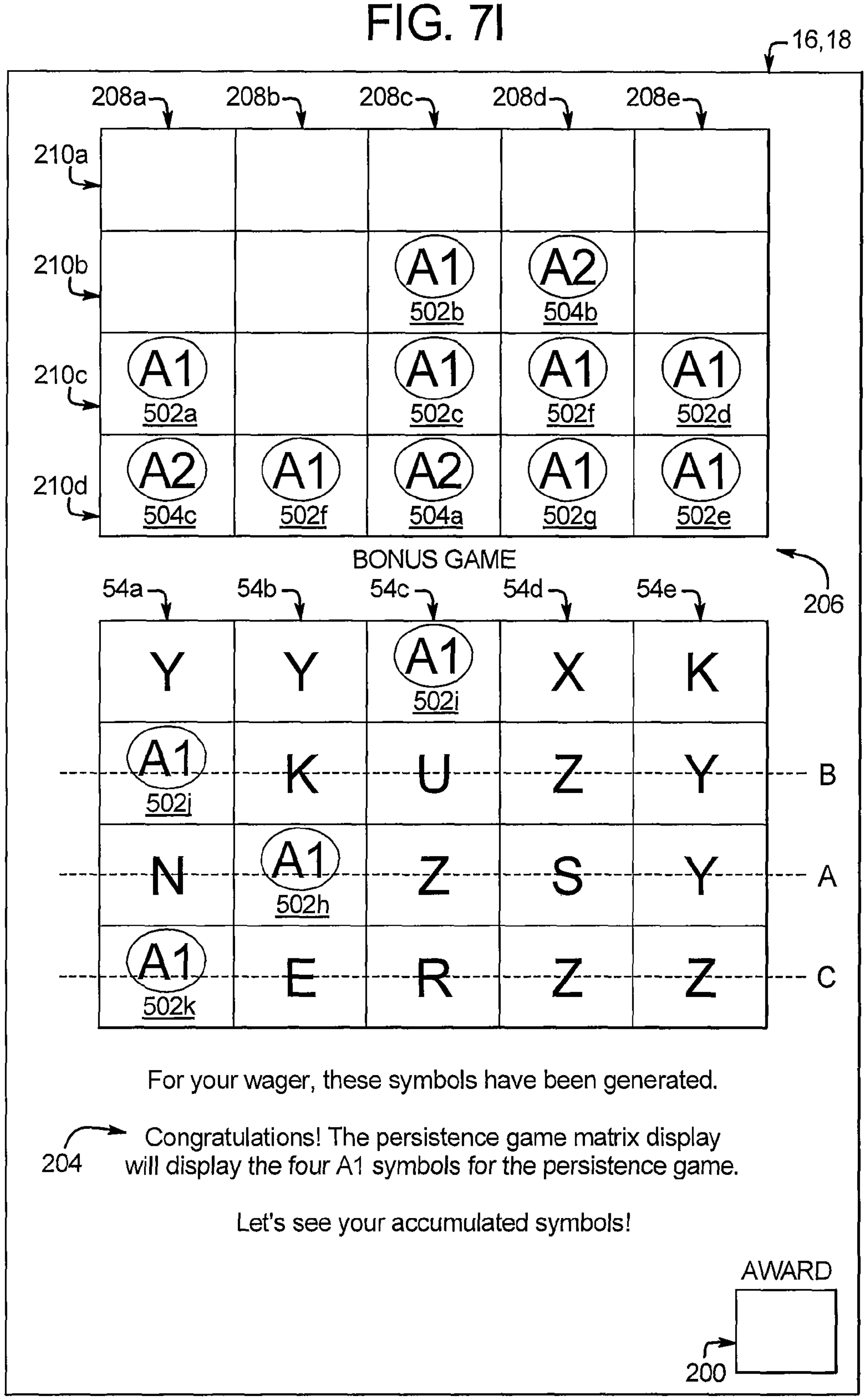

As illustrated in FIG. 7I, the gaming system generates and displays a plurality of symbols on the reels 54*a* through 54*e* for a play of the wagering game. The gaming system determines to accumulate: the "A1" symbol 502*j*; the "A1" symbol 502*k*; the "A1" symbol 502*h*; and the "A1" symbol 502*i*. An appropriate message such as "For you wager, these symbols have been generated. Congratulations! The persistence game arrangement will display the four A1 symbols for the persistence game. Let's see your accumulated symbols!" is provided to the player visually, such as in the message display 204, or through suitable audio or audiovisual displays.

Figure 7J:
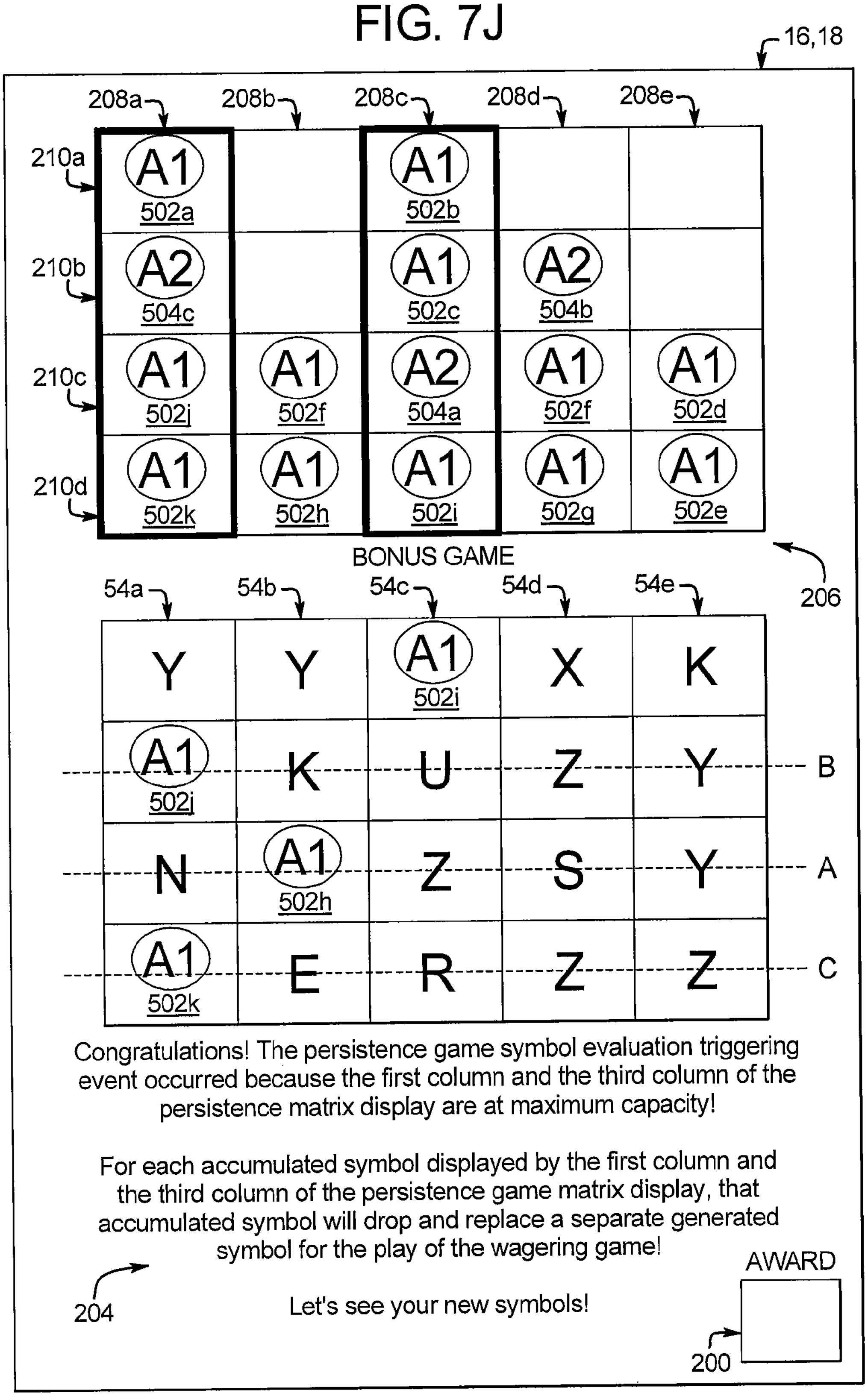

As illustrated in FIG. 7J, for each of the accumulated symbols, the gaming system causes the persistence game arrangement 206 to display that accumulated symbol. More specifically, the gaming system causes: (i) column 208*b*, row 210*d* of the persistence game arrangement 206 to display the "A1" symbol 502*h*; and column 208*c*, row 210*d* to display the "A1" symbol 502*i*. It should be appreciated that by causing column 208*a*, row 210*c* to display the "A1" symbol 502*j* and by causing column 208*a*, row 210*d* to display the "A1" symbol 502*k*, the "A1" symbol 502*a* and the "A1" symbol 502*c* moved up. It should also be appreciated that by causing column 208*b*, row 210*d* to display the "A1" symbol 502*h*, the "A1" symbol 502*f* moved up. It should also be appreciated that by causing column 208*c*, row 210*d* to display the "A1" symbol 502*i*, the "A1" symbol 502*b*, the "A1" symbol 502*c* and the "A2" symbol 504*a* each moved up.

In FIG. 7J, the gaming system determines whether the persistence game symbol utilization event occurs. In this example, the persistence game symbol utilization event occurs if any column of the persistence game arrangement is at a maximum capacity of accumulated symbols. In this example, the persistence game symbol utilization event can occur in association with a play of the wagering game or the bonus game. As illustrate in FIG. 7J, the persistence game symbol utilization trigger event occurs because column 208*a* and column 208*c* of the persistence game arrangement 206 are each at maximum capacity of accumulated symbols as indicated by the highlighted areas surrounding columns 208*a* and 208*c*. An appropriate message such as "Congratulations! The persistence game symbol evaluation triggering event occurred because the first column and the third column of the persistence arrangement are at maximum capacity! For each accumulated symbol displayed by the first column and the third column of the persistence game arrangement, that accumulated symbol will drop and replace a separate generated symbol for the play of the wagering game! Let's see your new symbols!" is provided to the player visually, such as in the message display 204, or through suitable audio or audiovisual displays.

Figure 7K:
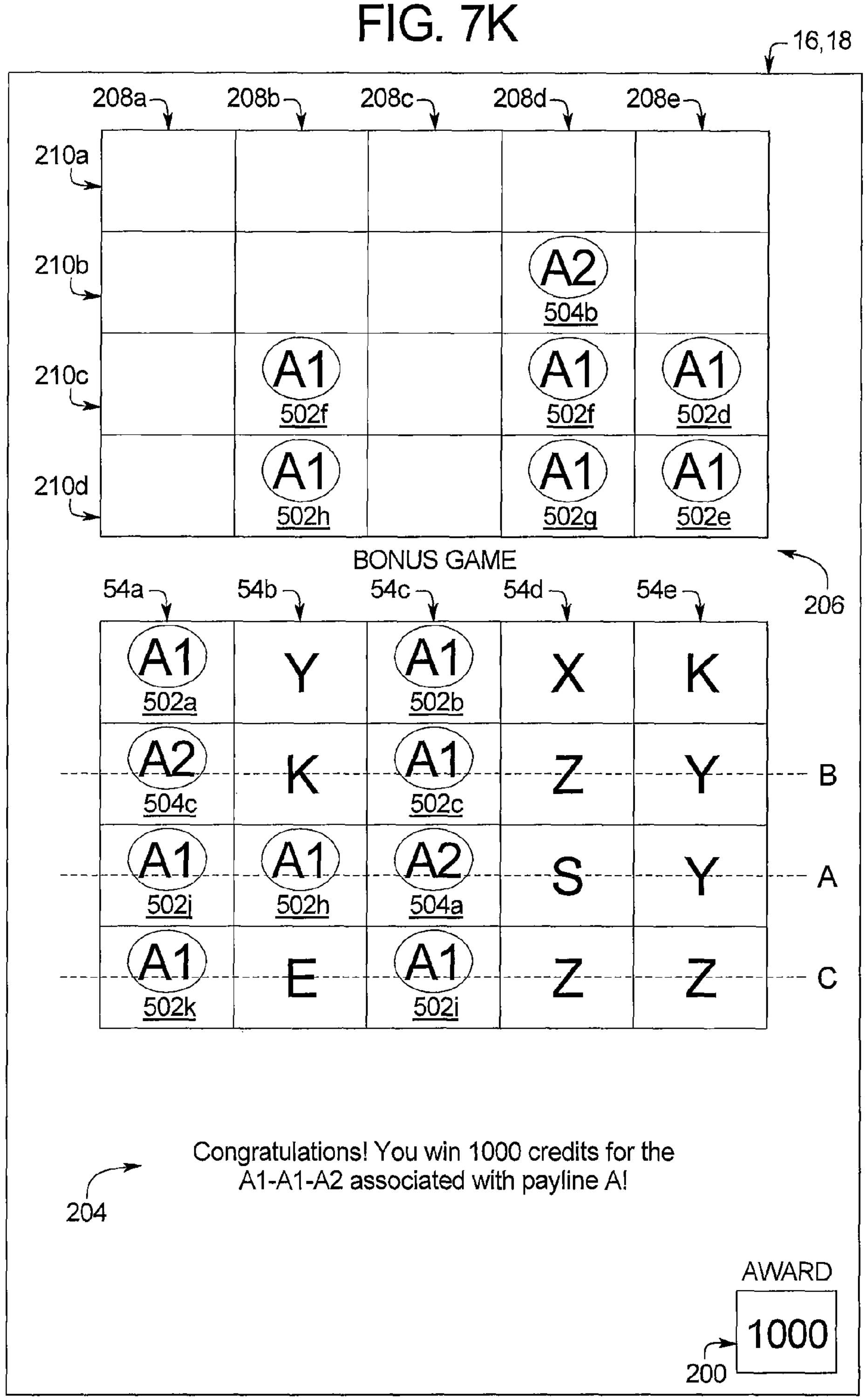

In FIG. 7K, the gaming system replaces certain generated symbols for the play of the wagering game with certain accumulated symbols displayed by the persistence game arrangement. More specifically, for each symbol accumulated and displayed by column 208*a* of the persistence game arrangement, the gaming system causes that symbol to replace a separate symbol generated by reel 54*a* for the play of the wagering game. For each symbol accumulated and displayed by column 208*c* of the persistence game arrangement, the gaming system causes that symbol to replace a separates symbol generated by reel 54*c* for the play of the wagering game.

In this example, after the generated symbols are replaced by the accumulated symbols, the gaming system determines whether the displayed symbols for the play of the wagering game form any predetermined winning symbol combinations. In this example, the gaming system determines that the displayed symbols form a predetermined winning symbol combination. More specifically, displayed symbols A1-A1-A2-S-Y associated with payline A form a predetermined winning symbol combination. The gaming system then provides a 1000 credits award for the displayed winning symbol combination A1-A1-A2-S-Y. The award meter 200 shows an award of one thousand credits, indicating that the gaming system provided an award associated with the A1-A1-A2-S-Y symbol combination. An appropriate message such as "Congratulations! You win for 1000 credits for the A1-A1-A2 associated with payline A!" is provided to the player visually, such as in the message display 204, or through suitable audio or audiovisual displays.

In one alternative embodiment, the gaming system determines to accumulate each generated symbol which forms a winning symbol combination for a play of a game. In one embodiment, for a play of a game, the gaming system determines to accumulate certain generated symbols that form winning symbol combinations. For example, for a play of a game, the gaming system generates symbols that form a first winning symbol combination associated with a first award and a second winning symbol combination associated with a second higher award than the first award. In this example, the gaming system determines to accumulate the generated symbols that form the second winning symbol combination because the second winning symbol combination is associated with a higher award than the first winning symbol combination. That is, in this example, the gaming system does not accumulate the generated symbols that formed the first winning symbol combination.

In one embodiment, the determination of which generated symbols can be accumulated for a play of a game is determined based on the player's wager. For example, the gaming system increases the types of symbols (or symbol combinations) available to be accumulated if the player increases their wager. In one embodiment, the types of symbols added based on the player's increased wager are higher valued symbols.

In different embodiments, the determination of which generated symbols can be accumulated for a play of game is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on time (such as the time of day), determined based on an amount of coin-in accumulated in one or more pools or determined based on any other suitable method or criteria.

In one embodiment, the accumulated symbols are different from the generated symbols. In one such embodiment, the accumulated symbols are symbols which are not utilized for plays of the wagering game or base game. In one example embodiment, the gaming system generates a red seven symbol for a play of a wagering game. In this example, for the generated red seven symbol, the gaming system accumulates and displays a purple seven symbol in association with a persistence game. In this example, no purple seven symbols are available to be generated for a play of the wagering game. That is, purple seven symbols are displayed in association with the persistence game and not the wagering game.

In different embodiments, wherein the gaming system removes at least one symbol from the persistence game arrangement, the determination of which symbol is removed from the persistence game arrangement is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on time (such as the time of day), determined based on an amount of coin-in accumulated in one or more pools or determined based on any other suitable method or criteria.

In one embodiment, the gaming system enables the player to purchase at least one accumulated symbol which can be utilized for a current of future play of a game. For example, the gaming system enables the player to add symbols to the persistence game arrangement by enabling the player to purchase symbols which will be displayed by the persistence game arrangement.

In one embodiment, the persistence game symbol evaluation trigger event and/or the persistence game symbol utilization trigger event occurs when an individual set of symbols (i.e., a column or row of the persistence game arrangement) reaches a designated level as described above. It should be appreciated that in one embodiment, the persistence game symbol evaluation trigger event and/or the persistence game symbol utilization trigger event can occur if one of the rows of the persistence game displays a designated number of accumulated symbols.

In various alternative embodiments, the persistence game symbol evaluation trigger event and/or the persistence game symbol utilization trigger event may be based on but not limited to at least one of: (i) an amount of time played on the gaming system; (ii) a random time of the day; (iii) an amount of money wagered on the gaming system; (iv) an amount of money lost at the gaming system; (v) an amount of money won at the gaming system; (vi) an amount of money wagered at games in a gaming system; (vii) an amount of money lost at the gaming systems in a gaming system; (viii) an amount of money won at the gaming systems in a gaming system; (ix) an event or outcome occurring in the primary game of one of the gaming systems; (x) an event occurring due to a shared random outcome generation; (xi) meeting one or more thresholds, such as a number of plays or a wager pool exceeding a designated amount; (xii) a random determination based on an amount wagered; (xiii) an occurrence of a predetermined event; (xiv) one or more side wagers placed; and (xv) any combination of these.

In one embodiment, the persistence game symbol evaluation trigger event and/or the persistence game symbol utilization trigger event is based on an outcome of a secondary game. For example, in different embodiments, the accumulator advancement triggering event is based on any suitable player input selection game, any puzzle-type game, and any suitable offer and acceptance game, or any spinning wheel game.

In one embodiment, the gaming system replaces one or more generated symbols of a currently played game with one or more accumulated symbols as described above. In one embodiment, for each accumulated and displayed symbol, the gaming system causes that symbol to replace a separate generated symbol for a current play of a game. In one embodiment, the gaming system causes a plurality of accumulated symbols to replace a plurality of generated symbols for a current play of a game. In different embodiments, the determination of which accumulated symbols will replace which generate symbols is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In different embodiments, the determination of which generated symbols are to be replaced by accumulated symbols is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, for an accumulated symbol that replaces a generated symbol, the gaming system causes that accumulated symbol to change to a different symbol. In one example embodiment, the gaming system previously accumulated a purple seven symbol. In this example, when the gaming system replaces one of the generated symbols with the accumulated purple seven, the gaming system causes that purple seven to change to a modifier symbol, such as a multiplier symbol. In one embodiment, each accumulated symbol which replaces a generated symbol functions as a wild symbol.

In one embodiment, for an accumulated symbol, the gaming system causes that accumulated symbol to change to a different symbol based on where the persistence game arrangement that accumulated symbol. For example, if a first row of a persistence game arrangement displays an accumulated multiplier symbol, that accumulated multiplier symbol is a "2×" multiplier. In this example, if the gaming device subsequently causes the second row of the persistence game arrangement to display that accumulated multiplier symbol (i.e., the accumulated multiplier symbol moves up because another generated symbol is determined to be accumulated), the accumulated multiplier symbol changes to a "5×" multiplier symbol. In other words, in this example, the gaming system changes an accumulated symbol based upon the position of that accumulated symbol in the persistence game arrangement.

In one embodiment, the persistence game symbol utilization trigger event occurs based on whether any set of symbols of a persistence game arrangement are at a maximum capacity. In this embodiment, upon the occurrence of the persistence game symbol utilization trigger event, for each symbol displayed in the set of symbols at a maximum capacity, the gaming system causes that symbol displayed in that set to replace a generated symbol. In this embodiment, the gaming system also randomly determines whether to cause other sets of symbols of the persistence game arrangement that are not at maximum capacity to replace any generated symbols.

In one embodiment, upon the occurrence of a persistence game symbol utilization trigger event, the gaming system enables the player to select the generated symbols to be replaced. In one embodiment, upon the occurrence of the persistence game utilization trigger event, for each accumulated symbol, the gaming system enables a player to selectively replace a separate generated symbol with the accumulated symbol. In another embodiment, upon the occurrence of the persistence game utilization trigger event, the gaming system enables a player to selectively replace at least one generated symbol with at least one accumulated symbol.

In different embodiments, the awards associated with the formed winning symbol combinations include, but are not limited to: a quantity of free activations of one or more games; an applicable multiplier for at least one, a plurality or each of the free spins; a credit amount (based on a triggering event and/or a wager placed); a quantity of picks in the game; a quantity of selections in the game; a quantity of retrigger symbols in the game; a quantity of terminators or termination symbols in the game; a quantity of anti-terminators in the game; a quantity of locking reels in the game; a quantity of locking symbol positions in the game; a quantity of expanding symbols in the game; a quantity of rounds or levels in the game; a quantity of award opportunities in the game; a quantity of progressive awards in the game; a range of available awards in the game; a quantity of active reels in the game; a quantity of offers in the game; a paytable which will be utilized in the game; a quantity of hands of playing cards in the game; any combination thereof; and any other suitable award. In one embodiment, the award associated with the accumulator includes an activation of an additional win opportunity such as a two way pays feature.

In one embodiment, where the gaming system employs a base game and bonus game, any accumulated symbols that are not utilized for a play of the bonus game are carried over into the base game and vice versa.

In one embodiment, the persistence game symbol evaluation trigger event for a play of a bonus game is different than the persistence game symbol evaluation trigger event for a play of a base game. In one example embodiment, the persistence game symbol evaluation trigger event for a play of a bonus game occurs if the gaming system generates two identical designated symbols for a play of the bonus game. In this example, the persistence game symbol evaluation trigger event for a play of a base game occurs if the gaming system generates three identical designated symbols for a play of the bonus game. In one embodiment, the persistence game symbol utilization trigger event for a play of a bonus game is different then the persistence game symbol utilization trigger event for the play of a base game.

In one alternative embodiment, the gaming system utilizes different accumulated symbols displayed by the persistence game arrangement in association with a play of bonus game than a play of a base game. In one example embodiment, the gaming system includes a persistence game arrangement that includes five columns. In this example embodiment, upon the occurrence of a persistence game symbol utilization trigger event for a play of a bonus game, the gaming system causes each symbol accumulated and displayed by each of the five columns of the persistence game arrangement to replace a separately generated symbol for the play of the bonus game. Conversely, upon the occurrence of a persistence game symbol utilization trigger event for a play of a base game, the gaming system causes each symbol accumulated and displayed by one of the five columns of the persistence game arrangement to replace a separately generated symbol for the play of the base game.

In one embodiment, where the gaming system employs a base game and bonus game, the bonus triggering event occurs based on an elapsed period of time, such as ten minutes since the last occurrence of a group bonus triggering event. In various alternative embodiments, the group bonus triggering event may be based on, but not limited to, one or more of: (i) a random time of the day; (ii) an amount of money wagered on the gaming system; (iii) an amount of money lost at the gaming system; (iv) an amount of money won at the gaming system; (v) an amount of money wagered at games in a gaming system; (vi) an amount of money lost at the gaming systems in a gaming system; (vii) an amount of money won at the gaming systems in a gaming system; (viii) an event or outcome occurring in the primary game of one of the gaming systems; (ix) an event occurring due to a shared random outcome generation; (x) meeting one or more thresholds, such as a number of plays or a wager pool exceeding a designated amount; (xi) a random determination based on an amount wagered; (xii) an occurrence of a predetermined event; (xiii) one or more side wagers placed; and (xiv) any combination of these.

In one embodiment, the awards associated with the formed winning symbol combinations in association with a play of the base game and the awards associated with the formed winning symbol combinations in association with a play of the bonus game are the same. In another embodiment, the awards associated with the formed winning symbol combinations in association with a play of the base game and the award associated with the formed winning symbol combinations in association with a play of the bonus game are the different.

In one alternative embodiment and in association with any of the above described embodiments, the gaming system causes a reel strip to accumulate and display generated symbols for a play of game. In one embodiment, the gaming system includes a persistence game arrangement which is at a maximum capacity. In this embodiment, for an additional generated symbol that is determined to be accumulated, the gaming system causes an additional reel strip to display that additional generated symbol because the persistence game arrangement is at maximum capacity. In another embodiment, the gaming system causes an additional reel strip to display a previously accumulated symbol (i.e., a symbol already displayed by the persistence game arrangement) to create space for an additional accumulated symbol. That is, in this embodiment, when a persistence game arrangement is at maximum capacity and the gaming system determines to accumulate an additional symbol, rather than causing the persistence game arrangement to remove previously accumulated symbols to create space for the additional symbol, the gaming system causes additional reel strips to display the previously accumulated symbols of the persistence game arrangement. In other words, the previously accumulated symbols move from the persistence game arrangement to the reel strips.

In one embodiment, the reel strips which display previously generated symbols are each configured to display a maximum quantity of symbols. In one embodiment, the gaming system causes a reel strip to stop displaying any additional accumulated symbols when the quantity of symbols displayed by that reel strip reaches a designated level.

In one embodiment, upon a suitable triggering event the gaming system determines whether the accumulated symbols displayed by the reel strips form any winning symbol combinations. In one embodiment, the gaming system causes each of the reels strips to spin and generate symbols for a play of a game. In this embodiment, the gaming system determines whether any of the generated symbols form any winning symbol combinations and provides any awards associated with the formed winning symbol combinations.

In one embodiment, the gaming system and/or the player tracking system tracks the accumulated symbols. In this embodiment, the player is enabled to end a first game play and start a second game play, at a later time. When the player starts the second game play, the player tracking system enables the player to begin with the same accumulated symbols the player accumulated when the player ended the first game play. In one embodiment, the accumulated symbols are stored for a specific gaming device. In another embodiment, in a server based gaming system, a network server stores the accumulated symbols and thus the player is enabled to play any of the gaming devices connected to the network using the stored accumulated symbols. In another embodiment, the gaming system and/or player tracking system does not track any accumulated symbols when a player completes a game.

In another embodiment, upon an initiation of a gaming session, the gaming system causes the persistence game arrangement to display zero, one or more symbols. That is, before a player starts a first play of the game, the gaming system displays zero, one or more symbols in the persistence game arrangement. In different embodiments, the determination of which symbols are to be displayed and the quantity of symbols displayed by the persistence game arrangement is predetermined, randomly determined, determined based on the player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, when a first player leaves the gaming system, any accumulated symbols displayed by the persistence game arrangement remain accumulated and displayed. That is, in this embodiment, the gaming system enables a different second player to start a play of game that can utilize symbols previously accumulated by the first player's previous plays of the game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) for each of a plurality of plays of a wagering game, generate a symbol combination from a plurality of different symbol combinations including a plurality of designated winning symbol combinations;

(b) display a persistence game arrangement during said plays of the wagering game, wherein the persistence game arrangement includes any of a predetermined number of accumulated designated winning symbol combinations;

(c) for each designated winning symbol combination generated, cause an accumulation of said generated designated winning symbol combination in the persistence game arrangement, wherein if the predetermined number of designated winning symbol combinations have been previously accumulated in the persistence game arrangement, replace one of said previously accumulated designated winning symbol combinations in the persistence game arrangement with said generated designated winning symbol combination; and (d) upon a persistence game symbol evaluation triggering event, if any designated winning symbol combinations are currently accumulated in the persistence game arrangement, provide at least one award associated with at least one of the designated winning symbol combinations currently accumulated in the persistence game arrangement.

2. The gaming system of claim 1, wherein when executed by the at least one processor, the plurality of instructions cause the at least one processor to:

(a) for each of any designated winning symbol combinations generated in association with one of the plays of the wagering game, provide at least one award associated with said designated winning symbol combination based on a first paytable having a first average expected payout; and (b) upon the persistence game symbol evaluation triggering event, for each of any designated winning symbol combinations currently accumulated in the persistence game arrangement, provide at least one award associated with said designated winning symbol combination based on a different second paytable having a second average expected payout.

3. The gaming system of claim 1, wherein when executed by the at least one processor, if the persistence game symbol evaluation triggering event occurs, the plurality of instructions cause the at least one processor to modify the at least one award at least one modifier.

4. The gaming system of claim 1, wherein at least one accumulated symbol of at least one winning symbol combination is part of two designated winning symbol combinations currently accumulated in the persistence game arrangement.

5. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) receive a wager for a play of a wagering game, said play of said wagering game having a first average expected payout;

(b) for said play of the wagering game:

(i) generate and display a symbol combination from a plurality of symbols;

(ii) determine whether said generated and displayed symbol combination forms a designated winning symbol combination; and (iii) provide any awards associated with any formed designated winning symbol combinations;

(c) display a persistence game arrangement having a plurality of symbol positions;

(d) for a play of a persistence game associated with a plurality of plays of the wagering game, determine whether to accumulate a symbol associated with said generated and displayed symbol combination, said play of said persistence game having a different second average expected payout;

(e) if the determination is to accumulate the symbol associated with said generated and displayed symbol combination:

(i) determine whether each of the symbol positions of the persistence game arrangement is occupied with one of the plurality of symbols;

(ii) if each of the symbol positions of the persistence game arrangement is occupied, remove at least one of said symbols from at least one of said plurality of symbol positions of the persistence game arrangement; and (iii) after removing at least one of said symbols or if at least one of said symbol positions of the persistence game arrangement is unoccupied, accumulate said symbol associated with said generated and displayed symbol combination and cause the persistence game arrangement to display said accumulated symbol; and (f) upon a persistence game symbol evaluation triggering event:

(i) determine whether any symbols displayed by the persistence game arrangement form any designated winning symbol combinations; and (ii) provide any awards associated with any formed designated winning symbol combinations.

6. The gaming system of claim 5, wherein when executed by the at least one processor, the plurality of instructions cause the at least one processor to, for the play of the persistence game, accumulate each of the symbols that form any designated winning symbol combination for the play of the wagering game.

7. The gaming system of claim 5, wherein the symbol which is associated with said generated and displayed symbol combination includes one of the plurality of symbols of the generated and displayed symbol combination.

8. The gaming system of claim 5, wherein when executed by the at least one processor, the plurality of instructions cause the at least one processor to, for the play of the persistence game, determine whether to accumulate a plurality of symbols associated with said generated and displayed symbol combination.

9. The gaming system of claim 5, wherein when executed by the at least one processor, the plurality of instructions cause the at least one processor to:

(a) for said play of the wagering game, determine whether said generated and displayed symbol combination forms the designated winning symbol combination based on a first paytable having the first average expected payout; and (b) for said play of the persistence game, determine whether any accumulated and displayed symbols form any designated winning symbol combinations based on a different second paytable having the second average expected payout.

10. The gaming system of claim 5, wherein when executed by the at least one processor, for the play of the persistence game, the plurality of instructions cause the at least one processor to modify any awards by at least one modifier.

11. The gaming system of claim 5, wherein when executed by the at least one processor, the plurality of instructions cause the at least one processor to:

(a) for said play of the wagering game, determine whether said generated and displayed symbol combination forms the designated winning symbol combination based on a first type of symbol evaluation; and (b) for said play of the persistence game, determine whether any accumulated and displayed symbols form any designated winning symbol combinations based on a different, second type of symbol evaluation.

12. The gaming system of claim 5, wherein when executed by the at least one processor, plurality of instructions cause the at least one processor to, after any awards are provided for the persistence game, cause the accumulated symbols displayed by the persistence game arrangement to remain accumulated for a subsequent play of the persistence game.

13. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) for a first play of a game:

(i) generate and display a first set of symbols from a plurality of symbols;

(ii) determine whether to accumulate a symbol associated with said first set of symbols; and (iii) if the determination is to accumulate the symbol associated with said first set of symbols, separate from the display of said first set of symbols, accumulate and display the symbol associated with said first set of symbols in association with a persistence game; and (b) for a subsequent play of the game:

(i) generate and display a second set of symbols from the plurality of symbols; and (ii) upon a random occurrence of a persistence game symbol utilization triggering event:

(A) automatically replace a symbol of the second set with an accumulated and displayed symbol to form a third set of displayed symbols;

(B) determine whether said third set of displayed symbols form any designated winning symbol combinations; and (C) provide any awards associated with any formed designated winning symbol combinations.

14. The gaming system of claim 13, wherein the game includes a base game.

15. The gaming system of claim 13, wherein the game includes a bonus game.

16. The gaming system of claim 13, wherein when executed by the at least one processor, the plurality of instructions cause the at least one processor to determine whether to accumulate a plurality of symbols associated with said first set of symbols.

17. The gaming system of claim 13, wherein when executed by the at least one processor, the plurality of instructions cause the at least one processor to, for the subsequent play of the game, upon the persistence game symbol utilization triggering event, replace a plurality of symbols of the second set with a plurality of accumulated and displayed symbols to form a third set of displayed symbols.

18. The gaming system of claim 13, wherein when executed by the at least one processor, the plurality of instructions cause the at least one processor to cause a persistence game arrangement to display said accumulated symbol.

19. The gaming system of claim 18, wherein said persistence game arrangement includes a plurality of sets of symbol positions.

20. The gaming system of claim 19, wherein the persistence game symbol utilization triggering event is based on whether at least one of the sets of symbol positions has accumulated a maximum quantity of accumulated symbols.

21. The gaming system of claim 13, wherein for the first play of the game, said accumulated symbol is different from each of said generated symbols.

22. The gaming system of claim 13, wherein for the first play of the game, said accumulated symbol includes one of said generated symbols.

23. The gaming system of claim 13, wherein when executed by the at least one processor, the plurality of instructions cause the at least one processor to:

(a) for said first play of the game, determine whether said first set of symbols form any designated winning symbol combinations based on a first paytable having a first average expected payout; and (b) for said subsequent play of the game, determine whether said third set of symbols form any designated winning symbol combinations based on a different second paytable having a second average expected payout.

24. The gaming system of claim 13, wherein when executed by the at least one processor, the plurality of instructions cause the at least one processor to:

(a) for said first play of the game, determine whether said first set of symbols form any designated winning symbol combinations based on a first type of symbol evaluation; and (b) for said subsequent play of the game, determine whether said third set of symbols form any designated winning symbol combinations based on a different, second type of symbol evaluation.

25. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) for a first play of a base game upon a wager:

(i) generate and display a first set of symbols from a plurality of symbols; and (ii) accumulate a symbol associated with said first set of symbols;

(b) for a first play of a bonus game:

(i) generate and display a second set of symbols from the plurality of symbols; and (ii) accumulate a symbol associated with said second set of symbols;

(c) in response to a persistence game symbol utilization triggering event randomly occurring in association with a subsequent play of the base game:

(i) automatically replace a symbol generated for the subsequent play of the base game with one of the accumulated symbols to form a third set of symbols;

(ii) determine whether said third set of symbols form any designated winning symbol combinations; and (iii) provide any awards associated with any formed designated winning symbol combinations; and (d) in response to the persistence game symbol utilization triggering event randomly occurring in association with a subsequent play of the bonus game:

(i) automatically replace a symbol generated for the play of the subsequent bonus game with one of the accumulated symbols to form a fourth set of symbols;

(ii) determine whether said fourth set of symbols form any designated winning symbol combinations; and (iii) provide any awards associated with any formed designated winning symbol combinations.

26. The gaming system of claim 25, wherein when executed by the at least one processor, the plurality of instructions cause the at least one processor to cause a persistence game arrangement to display said accumulated symbols.

27. The gaming system of claim 26, wherein said persistence game arrangement includes a plurality of sets of symbol positions.

28. The gaming system of claim 27, wherein the persistence game symbol utilization triggering event is based on whether at least one of the sets of symbol positions has accumulated a maximum quantity of accumulated symbols.

29. The gaming system of claim 25, wherein for the first play of the base game, said accumulated symbol is different from each of said generated symbols.

30. The gaming system of claim 25, wherein for the first play of the bonus game, said accumulated symbol is different from said accumulated symbol from the first play of the base game.

31. The gaming system of claim 25, wherein when executed by the at least one processor, the plurality of instructions cause the at least one processor to:

(a) for said first play of the base game, determine whether said first set of symbols form any designated winning symbol combinations based on a first paytable having a first average expected payout; and (b) for said subsequent play of the base game, determine whether said third set of symbols form any designated winning symbol combinations based on a different second paytable having a second average expected payout.

32. The gaming system of claim 25, wherein when executed by the at least one processor, the plurality of instructions cause the at least one processor to:

(a) for said first play of the base game, determine whether said first set of symbols form any designated winning symbol combinations based on a first type of symbol evaluation; and (b) for said subsequent play of the base game, determine whether said third set of symbols form any designated winning symbol combinations based on a different, second type of symbol evaluation.

* * * * *

UNITED STATES PATENT AND TRADEMARK OFFICE
CERTIFICATE OF CORRECTION

PATENT NO. : 8,425,303 B2
APPLICATION NO. : 12/618184
DATED : April 23, 2013
INVENTOR(S) : Timothy L. Kennedy et al.

It is certified that error appears in the above-identified patent and that said Letters Patent is hereby corrected as shown below:

IN THE CLAIMS

In Claim 1, Column 41, Line 57, replace “wherein” with --and--.
In Claim 3, Column 42, Line 25, between “award” and “at” insert --by--.

Signed and Sealed this
Eighteenth Day of February, 2014

Michelle K. Lee
*Deputy Director of the United States Patent and Trademark Office*